(12) United States Patent
Kirmse

(10) Patent No.: US 11,841,731 B2
(45) Date of Patent: Dec. 12, 2023

(54) CLOUD PLUGIN FOR LEGACY ON-PREMISE APPLICATION

(71) Applicant: SAP SE, Walldorf (DE)

(72) Inventor: Daniel Kirmse, Berlin (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/484,688

(22) Filed: Sep. 24, 2021

(65) Prior Publication Data

US 2023/0103087 A1 Mar. 30, 2023

(51) Int. Cl.
*G06F 9/44* (2018.01)
*G06F 9/455* (2018.01)
*G06F 9/445* (2018.01)
*G06F 8/61* (2018.01)
*G06F 16/11* (2019.01)

(52) U.S. Cl.
CPC .............. *G06F 8/61* (2013.01); *G06F 16/122* (2019.01)

(58) Field of Classification Search
CPC ................................. G06F 8/61; G06F 16/122
See application file for complete search history.

(56) References Cited

U.S. PATENT DOCUMENTS

| | | | |
|---|---|---|---|
| 10,320,625 B1 | 6/2019 | Cherumbath | |
| 10,338,964 B1 | 7/2019 | Kancharla et al. | |
| 10,387,385 B1 * | 8/2019 | Mart | G06F 16/22 |
| 11,113,090 B1 | 9/2021 | Wilkinson et al. | |
| 11,372,820 B1 | 6/2022 | Harjono et al. | |
| 2011/0083138 A1 | 4/2011 | Sivasubramanian et al. | |
| 2013/0263088 A1 * | 10/2013 | Hoff | G06F 9/45529 717/121 |

(Continued)

FOREIGN PATENT DOCUMENTS

| | | | | |
|---|---|---|---|---|
| CN | 103268319 A | * | 8/2013 | |
| CN | 108595221 A | * | 9/2018 | ......... G06F 9/44526 |

(Continued)

OTHER PUBLICATIONS

Enis Afgan, CloudLaunch: Discover and Deploy Cloud Applications, 2018, pp. 1-9. https://arxiv.org/ftp/arxiv/papers/1805/1805.04005.pdf (Year: 2018).*

(Continued)

*Primary Examiner* — Mongbao Nguyen
(74) *Attorney, Agent, or Firm* — SCHWEGMAN LUNDBERG & WOESSNER, P.A.

(57) ABSTRACT

Various examples described herein are directed to systems and methods for managing a cloud-implemented database management application. A frontend service executing at a cloud environment may receive a plugin request from a first user associated with a first user group and determine a version of a database management application executing at the cloud environment for the first user group. The frontend service may access a plugin catalog to determine at least one plugin compatible with the database management application and provide an indication of the at least one plugin to the first user. The frontend service may receive from the first user a selection of a first plugin from the at least one plugin (Continued)

and call a plugin installer service executing at the cloud environment to install the first plugin to the database management application.

20 Claims, 15 Drawing Sheets

(56) References Cited

U.S. PATENT DOCUMENTS

| | | | |
|---|---|---|---|
| 2016/0294614 A1 | 10/2016 | Searle et al. | |
| 2017/0046181 A1* | 2/2017 | Williams | H04L 63/0823 |
| 2017/0115978 A1 | 4/2017 | Modi et al. | |
| 2017/0330195 A1* | 11/2017 | Lange | G06F 3/04817 |
| 2018/0004792 A1 | 1/2018 | Desai et al. | |
| 2018/0011699 A1 | 1/2018 | Manthiramoorthy et al. | |
| 2019/0102280 A1 | 4/2019 | Caldato et al. | |
| 2019/0146772 A1 | 5/2019 | Griffin et al. | |
| 2019/0317887 A1* | 10/2019 | Wiener | G06F 11/3664 |
| 2019/0370471 A1 | 12/2019 | Petratos et al. | |
| 2021/0049267 A1* | 2/2021 | Wu | G06F 21/554 |
| 2022/0050674 A1 | 2/2022 | Liljeback et al. | |
| 2022/0107802 A1* | 4/2022 | Rao | G06F 16/907 |
| 2022/0292106 A1* | 9/2022 | Umay | G06F 16/211 |
| 2022/0294788 A1* | 9/2022 | Pattar | G06F 21/41 |
| 2022/0365801 A1* | 11/2022 | Kasso | H04L 67/141 |
| 2023/0070209 A1* | 3/2023 | Srinivasan | G06F 16/3326 |
| 2023/0096143 A1 | 3/2023 | Kirmse | |
| 2023/0102769 A1 | 3/2023 | Kirmse | |
| 2023/0103223 A1 | 3/2023 | Kirmse | |

FOREIGN PATENT DOCUMENTS

| | | | | |
|---|---|---|---|---|
| CN | 110347440 A | * | 10/2019 | G06F 16/252 |
| EP | 3451341 A1 | * | 3/2019 | G06F 21/6254 |
| EP | 3557408 A1 | * | 10/2019 | G06F 16/25 |
| WO | WO-2013148144 A1 | * | 10/2013 | G06F 8/61 |
| WO | WO-2016028973 A1 | * | 2/2016 | G06F 8/61 |

OTHER PUBLICATIONS

Bartosz Zurkowski, Towards Self-organizing Cloud Polyglot Database Systems, 2019, pp. 82-.87 https://ieeexplore.ieee.org/stamp/stamp.jsp?tp=&arnumber=8780526 (Year: 2019).*

Lyublena Antova, Rapid Adoption of Cloud Data Warehouse Technology using Datometry Hyper-Q, 2018, pp. 1-15. https://dl.acm.org/doi/pdf/10.1145/3183713.3190652 (Year: 2018).*

"U.S. Appl. No. 17/484,637, Final Office Action dated Mar. 23, 2023", 9 pgs.

"U.S. Appl. No. 17/484,637, Non Final Office Action dated Nov. 10, 2022", 9 pgs.

"U.S. Appl. No. 17/484,637, Notice of Allowance dated May 26, 2023", 8 pgs.

"U.S. Appl. No. 17/484,637, Response filed Feb. 10, 2023 to Non Final Office Action dated Nov. 10, 2022", 12 pgs.

"U.S. Appl. No. 17/484,637, Response filed May 4, 2023 to Final Office Action dated Mar. 23, 2023", 12 pgs.

"U.S. Appl. No. 17/484,667, Notice of Allowance dated Apr. 12, 2023", 22 pgs.

Sharma, Prateek, "Containers and Virtual Machines at Scale: A Comparative Study", Proceedings of the 17th International Middleware Conference, Article No. 1, [Online]. Retrieved from the Internet: <https://dl.acm.org/doi/pdf/10.1145/2988336.2988337>, (2016), 1-13.

"U.S. Appl. No. 17/484,637, Preliminary Amendment filed Jun. 20, 2023", 3 pgs.

"U.S. Appl. No. 17/484,667, Preliminary Amendment filed Jun. 20, 2023", 3 pgs.

"U.S. Appl. No. 17/484,754, Non Final Office Action dated Apr. 13, 2023", 30 pgs.

"U.S. Appl. No. 17/484,754, Response filed Jul. 6, 2023 to Non Final Office Action dated Apr. 13, 2023", 14 pgs.

"U.S. Appl. No. 17 484,667, Notice of Allowance dated Jul. 10, 2023", 8 pgs.

* cited by examiner

CLOUD PLUGIN FOR LEGACY ON-PREMISE APPLICATION

BACKGROUND

Traditionally, software has been self-contained and executed on one or more local machines. An enterprise desiring to use a software tool builds an on-premises computing system and executes a software application to provide the tool on that computing system. The software application may be developed by the enterprise and/or purchased from a third party software provider. Users access the software tool directly from the computing system or remotely via a networked user computing device.

BRIEF DESCRIPTION OF DRAWINGS

The present disclosure is illustrated by way of example and not limitation in the following figures.

DETAILED DESCRIPTION

Figure 1:
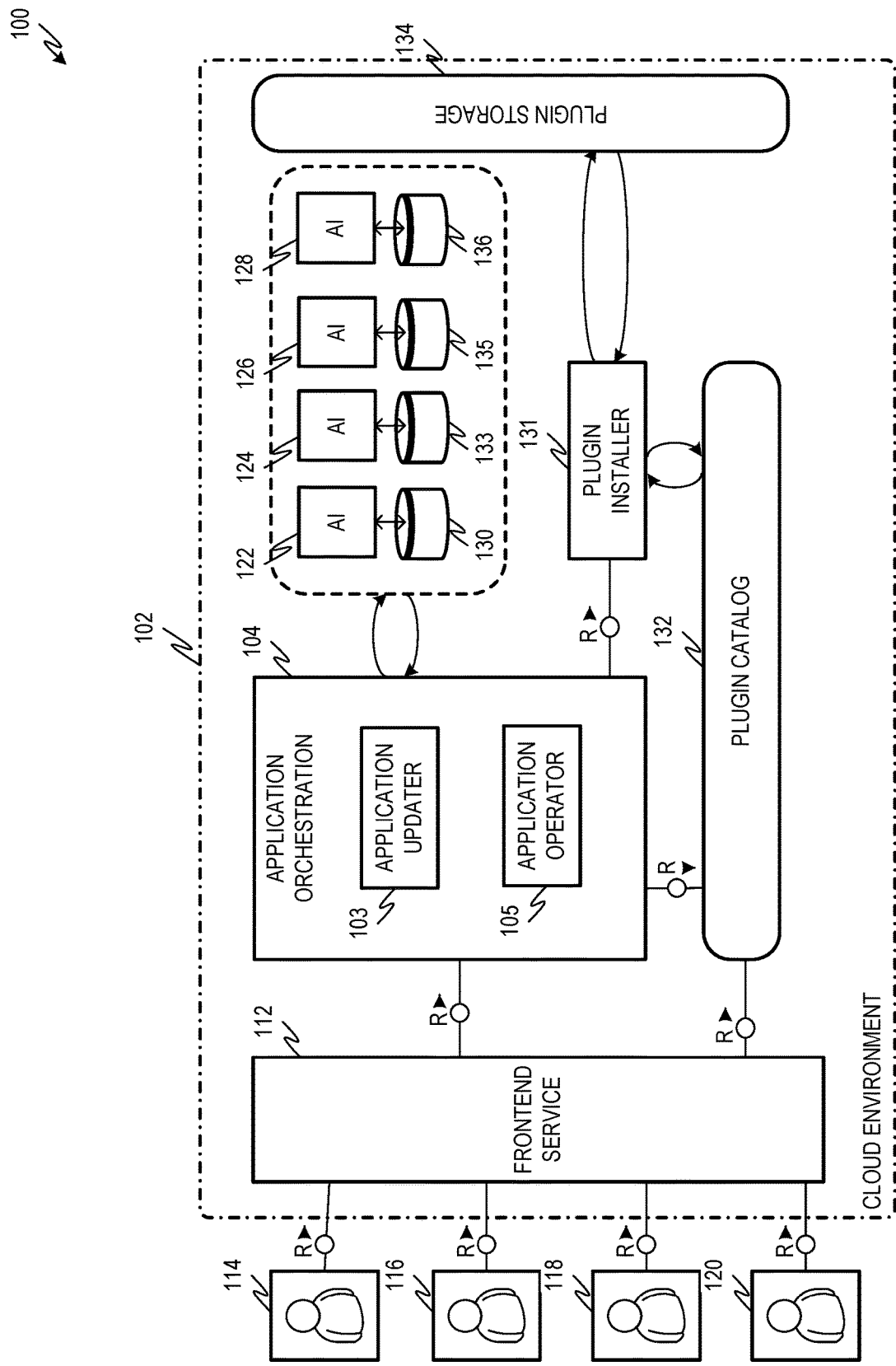
FIG. 1 is a diagram showing one example of an environment for providing plugin support to legacy on-premises applications executed in a cloud environment.

An on-premises software application is typically executed by a computing system built by an enterprise on-site or on-premises. An on-premises application may be implemented to include a set of one or more executables, libraries, and the like, that are implemented by a set of executable files, libraries, and the like that are resident at the on-premises computing system. Users associated with the enterprise access the software application from the on-premises computing system.

On-premises software applications are typically characterized by long release cycles. For example, changes to one functionality of the on-premises application may be implemented by changing one or more executables and/or libraries. The executables, libraries, and the like of the on-premises application, however, will typically implement multiple functionalities. This means that changes to one functionality of an on-premises application may require the re-testing of many different functionalities provided by the modified executable and/or library files. Also, when the on-premises application is a database management system, or other application interfacing with a data persistency, changes to the executable(s) and/or libraries for implementing the application may change the way that the application interfaces with the persistency. Accordingly, upgrading the on-premises application may include performing a data migration at the persistency (e.g., from one schema to a target schema). As a result, changes to an on-premises application may be made in batches. In this way, a batch of multiple changes can be tested, de-bugged, and deployed at the same time.

In contrast to an on-premises implementation, some software applications are executed in a cloud environment. A cloud environment includes one or more data centers implementing one or more virtual and/or hardware servers. The cloud environment executes instances of cloud applications. For example, an instance of a cloud application may execute to provide a software tool to a group of users (e.g., a group of users associated with an entity that purchases access to the software tool). Each instance of the cloud application comprises a set of one or more virtual machines and/or containers executing at the cloud environment.

Cloud-native applications are specifically developed to execute in a cloud environment. As a result, many cloud-native applications are designed according to a microservice architecture. In a microservice architecture, an instance of a software application is implemented by a collection of loosely-coupled microservices executing at the cloud environment. Each microservice may also include a single executable that executes in a separate virtual machine (VM) or container implemented by the cloud environment. In a microservice architecture, each microservice is programmed to perform a defined task or small set of tasks and interact with the other microservices in a defined way, for example, according to an application programming interface (API).

The degree of independence between microservices in a microservice-architecture application simplifies the process of testing and upgrading. For example, due to the nature of microservice architecture, a change to one microservice may have a limited effect on other microservices and/or on data persistencies used by the microservice-architecture application. Accordingly, many cloud-native microservice-architecture applications support testing and updating via a continuous or ongoing process, such as a continuous integration/continuous delivery (CI/CD) pipeline. In a CI/CD pipeline, a developer can make changes to a subset of the microservices making up an application instance. The changes are implemented as a modified build of the application. The modified build is deployed to various integration and testing environments. Provided that the modified build passes tests at the various integration and testing environments, it may be deployed to one or more cloud environments as a new build. If the new build is found to be defective or to include bugs, it can be rolled back by reverting to a previous version of the build.

In some examples, it is desirable to transition a software application designed for on-premises execution to a cloud environment. Because of the differences between a cloud environment and an on-premises computing system environment, such a transition may be non-trivial. In some examples, the executables, libraries, and the like of the on-premises application are configured to execute in one or more containers at the cloud environment. Orchestration services at the cloud environment may manage the containers executing at the cloud environment to provide instances of the application to groups of users associated with different customers.

In some examples, a legacy on-premises application can be fully re-factored and re-coded to conform to a microservices architecture. Once such a re-factoring and re-coding occurs, the now-cloud-native application may be continuously upgraded using a CI/CD pipeline or similarly continuous technique. Oftentimes, however, it is not desirable to perform a full re-factoring and re-coding of a legacy on-premises application. For example, such a conversion may be time and labor-intensive. Instead of a full re-factoring and recoding, an on-premises application may be subject to a partial re-factoring. In some examples, the existing executable(s) and libraries of an on-premises application are just configured to execute in a cloud-environment-executed container managed by one or more cloud services.

When an on-premises application is not fully-converted to a microservices architecture format, the resulting cloud implementation of the application may be less than optimally-suited for continuous updating. For example, container-implemented executables and/or libraries adapted from an on-premises implementation may not be as independent as a cloud-native applications. Accordingly, changes to one functionality implemented by an executable or library may entail more extensive testing of the other functionalities implemented by the same executable or library or other executables and/or libraries.

Also, a cloud application with container-implemented executables and/or libraries may not be independent of the schema or schemas of the persistencies used by the application. Accordingly, updating the application at the cloud may include performing a data migration at one or more cloud persistencies to make those persistencies consistent with the upgraded application. Such data migrations may be time and resource-intensive and, therefore, difficult to roll back in the event of a bug or other error.

Another challenge that arises when an on-premises application is migrated to a cloud environment relates to plugins, also sometimes referred to as application extensions or extensions. A plugin is a piece of software that extends or otherwise modifies the functionality of an instance of an application. For example, installing a plugin to an application may include modifying and/or supplementing an existing instance of an application rather than executing a different instance of the application.

In an on-premises implementation, an application developer provides a plugin to the on-site application administrators, for example, via download, or physical medium delivered to the premises. The application administrators have access to the server or other computing device on which an application instance executes, including the proper security authorizations and access to run a plugin installer to install, upgrade, or remove a plugin. Installing the plugin may include, for example, loading one or more additional executables to the on-site machine, adding a new library or OSGi bundle to the on-premises machine, adding Structured Query Language (SQL) or other database protocol procedures, and/or the like.

A cloud-native application may not use plugins in the same way as an on-premises application. For example, because a cloud-native application may be arranged according to a microservices architecture, adding new or additional functionality to a cloud-native application may be performed continuously by adding or modifying the microservices that implement the application. Changes to the microservices may be performed using a CI/CD pipeline or other continuous technique. Accordingly, users and user groups may not need direct access to the cloud environment to bring about the kinds of functionality changes that are implemented in on-premises using plugins.

When a legacy on-premises application is transitioned to a cloud implementation, however, the cloud-implemented legacy application may still be constructed for use with plugins. Accordingly, it may be desirable to allow users to select which plugins to install, upgrade, or remove. In a cloud arrangement, however, the customer only buys access to the application and a security concept to protect data and assets. The customer does not own the computer system executing the application and is not responsible for the security of the system. Accordingly, it may not be practical to allow a customer's users to upload and install plugins to the cloud environment. Failing to provide customers with any mechanism for installing or removing plugins, however, may limit the functionality of the legacy on-premises application relative to both on-premises implementations and fully cloud-native implementations.

These and other challenges may be addressed utilizing a plugin installer service at a cloud environment. The plugin installer service executes at the cloud environment, for example, at a container, and may be in communication with a plugin catalog data store and/or a plugin storage data store. A frontend service at the cloud environment may provide a user group (or representative user thereof) with an interface for choosing to install, upgrade, and/or remove a plugin for a current application instance. The frontend service may call the plugin installer service to retrieve a listing of one or more available plugins based on the plugin catalog and provide an indication of the available plugins to the representative user.

Upon receiving a plugin selection, the frontend service calls the plugin installer to install, upgrade, and/or remove the selected plugin. The plugin installer may retrieve the selected plugin from a plugin storage at the cloud environment and install it to the current application instance associated with the user group.

In this way, the user group may retain access to plugins to modify the functionality of a legacy on-premises application in a cloud environment while avoiding several of the potential disadvantages. For example, because the plugins are maintained by the cloud environment, the risk of inadvertently introducing malware to the cloud environment is reduced. Also, for example, because plugins remain available, the cloud implementation of the on-premises application may maintain the flexibility of the on-premises application without fully re-factoring the application to a cloud native format.

FIG. 1 is a diagram showing one example of an arrangement 100 for providing plugin support to legacy on-premises applications executed in a cloud environment 102. The cloud environment 102 executes one or more application instances 122, 124, 126, 128 and various services 112, 104, 131 to provide an application, such as a database management system application, to one or more user groups 114, 116, 118, 120.

The cloud environment 102 may include one or more computing devices, such as servers, for executing the application instances 122, 124, 126, 128 and services 112, 104. In some examples, the cloud environment 102 is one of a number of cloud environments implemented by a cloud service provider at different geographic locations. For example, the cloud environment 102 may be implemented at a data center or data centers geographically near to the user groups 114, 116, 118, 120 so as to minimize network latencies to the user groups 114, 116, 118, 120. Other cloud environments similar to the cloud environment 102 may be implemented at data centers geographically near to other user groups to provide the application to those user groups.

User groups 114, 116, 118, 120 indicate groups of one or more users who develop and/or use applications instances 122, 124, 126, 128 at the cloud environment 102. In some examples, each user group 114, 116, 118, 120 is associated with a stakeholder. For example, some user groups 114, 116, 118, 120 are associated with stakeholders who are customer entities. A customer entity purchases or otherwise acquires access to application instances 122, 124, 126, 128. A user group 114, 116, 118, 120 associated with a customer entity may include users who utilize one or more application instances 122, 124, 126, 128, for example, use the functionality of the applications. Also, for example, some user groups 114, 116, 118, 120 are associated with internal stakeholders of an entity providing the software application. For example, some user groups 114, 116, 118, 120 may be associated with a development group for developing some or all of the application instances 122, 124, 126, 128, a QA and/or testing user group for testing application instances 122, 124, 126, 128, and/or the like.

User groups 114, 116, 118 120 may be associated with one or more application instances 122, 124, 126, 128. For example, the user group 114 may be associated with application instance 122. The user group 116 may be associated with the application instance 124. The user group 118 may be associated with application instance 126. The user group 120 may be associated with application instance 128, and so on. In some examples, a user group 114, 116, 118, 120 may be associated with more than one instance of the application. For example, a user group 114, 116, 118, 120 may execute an instance of the application for a production implementation and another instance or instances of the application for a testing or evaluation use.

The cloud environment 102 also implements persistencies 130, 133, 135, 136. For examples, when the application instances 122, 124, 126, 128 implement a database management system, the persistencies 130, 133, 135, 136 may store data managed by the database management system application. The persistencies 130, 133, 135, 136 may be implemented using any suitable data storage device or devices such as, for example, one or more disks, one or more solid state drives, one or more random access memories, etc. In some examples, the software application implemented at the cloud environment 102 is a database management system application for an in-memory database such as, for example, the HANA® and S/4 HANA® systems available from SAP SE of Walldorf, Germany.

A persistency 130, 133, 135, 136 may be associated with a user group. In the example of FIG. 1, the persistency 130 is associated with user group 114. The persistency 133 is associated with user group 116. The persistency 135 is associated with the user group 118; and the persistency 136 is associated with the user group 120 and so on. In some examples, a single user group 114, 116, 118, 120 may be associated with more than one persistency. For example, a user group 114, 116, 118, 120 may maintain one persistency for a production implementation of the software application and another persistency for a test or evaluation implementation of the software application.

The application instances 122, 124, 126, 128 include a set of one or more executables, libraries, and/or other components executed within a single container or a limited set of containers implemented at the cloud environment. For example, the application instances 122, 124, 126, 128 may be instances of legacy on-premises applications executing within the cloud-implemented containers. In some examples, instances 122, 124, 126, 128 may be associated with respective persistencies 130, 133, 135, 136 as shown. In some examples, containers for executing the various application instances 122, 124, 126, 128 are executed using a container management arrangement, such as one or more Kubernetes® clusters.

A container may be unit of software that includes code dependencies of the code, such as libraries, etc. In this way, a container may run on different environments, such as in the cloud environments described herein, without relying on components of the environments themselves. In some examples, containers can be managed by a container runtime, such as a Docker® engine available from Docker, Inc. of Palo Alto, Calif.

In some examples, containers executing at the cloud environment 102 are managed using a container orchestration system, such as the Kubernetes® container orchestration system. For example, the container or containers implementing an application instance 122, 124, 126, 128 may be executed and managed as a cluster of containers. The container orchestration system may be configured to manage the execution of the containers including, for example, by managing persistencies of the containers, by spinning up a new version of the one or more containers if an existing version crashes, etc.

In some examples, containers are run from container images. A container image may be stored, for example, as described herein and may include executable code for implementing a container on a computing system, such as the cloud environment 102. For example, an application instance 122, 124, 126, 128 may be started at the cloud environment 102 by executing one or more container images to implement one or more containers for executing the application instance 122, 124, 126, 128.

Although multiple user groups 114, 116, 118, 120, application instances 122, 124, 126, 128, persistencies 130, 133, 135, 136 and the like are shown in FIG. 1, it will be appreciated that the cloud environment 102 may include any suitable number of these elements including, for example, one.

The cloud environment 102 also executes one or more services 112, 104, 131 for managing the application instances 122, 124, 126, 128 and any additional application instances executing at the cloud environment 102. The services 104, 112, 131 may execute at the cloud environment 102 in one or more containers. A frontend service 112 may interface with the user groups 114, 116, 118, 120. For example, the frontend service 112 may provide users from a user group 114, 116, 118, 120 with a user interface to allow the users to manage the application instances 122, 124, 126, 128 and/or to launch new application instances. For example, the frontend service 112 may provide the user groups 114, 116, 118, 120 with functionality for create, upgrade, delete, and/or otherwise manage application instances 122, 124, 126, 128. In some examples, the frontend service 112 also provides users from the user groups 114, 116, 118, 120 with data about available plugins, as described herein.

Application orchestration services 104 may manage the execution of the application instances 122, 124, 126, 128. The application orchestration service 104 may be implemented as a single service and/or as a set of one or more subservices. In the example of FIG. 1, the application orchestration services 104 include an application operator service 105 and an application updater service 103.

The application operator service 105 may manage the execution of the one or more containers implementing an application instance 122, 124, 126, 128. For example, the application operator service 105 may begin the execution of one or more containers for implementing an application instance 122, 124, 126, 128, for example, from on one or more container images associated with the one or more containers. Also, if one or more containers associated with an application instance 122, 124, 126, 128 crash, the application operator service 105 may spin up a replacement for the crashed container or containers.

The plugin installer service 131 may be in communication with the application orchestration service 104 and/or the frontend service 112 to install, upgrade, and/or remove plugins for the application instances 122, 124, 126, 128. The plugin installer service 131, application orchestration service 104 and/or the frontend service may be in communication with the plugin catalog 132. The plugin catalog 132 is or includes a persistence at the cloud environment 102 storing plugin catalog records describing one or more plugins for the application instance 122.

A plugin catalog record may include various information about a plugin including, for example, a name of the plugin, a description of the plugin, the application associated with the plugin, a version of the plugin, and an address indicating the location of a file or files for implementing the plugin. For example, the address may refer to a location at a plugin storage 134. In some examples, a plugin catalog record also includes an indication of a version or versions of the application. For example, some plugins may be compatible with less than all of the versions of an application. Also, in some examples, a plugin catalog record may include selector data describing a customer group. For example, some plugins may be authorized for use by selected user groups and not by other user groups.

EXAMPLE 1 below provides one example of a plugin catalog record for a first plugin called "plugin-xyz:"

EXAMPLE 1 apiVersion: feature.example.com/v1
kind: ProductPlugin
metadata:
  name: plugin-xyz
  spec:
    type: shared-library
    description: |some text that describes the plugin
    extendedProduct: product-a
    version:
      id: 1.0.0
    location: /path/to/plugin/in/plugin/storage In EXAMPLE 1, the plugin catalog record includes various fields. An "apiVersion" field indicates a name of the API version used by the plugin installer service 131 to interface with the plugin catalog 132. A "kind" field indicates the kind of record—in this case a "ProductPlugin" record indicating that the record is a plugin catalog record. A "name" field indicates the name of the plugin—"plugin-xyz." A "type" field indicates the type of the plugin—in this example, a shared library. The "description" field indicates a textual description that may be provided to one or more users of the user group 114, as described herein. The "extendedProduct" field indicates a name of the application with which the referenced plugin can be installed. In the example, the application is called "product-a." A version field indicates that the plugin is version "1.0.0." The "location" field includes the address of a location at the plugin storage 134 that includes one or more files for installing the plugin.

Figure 2:
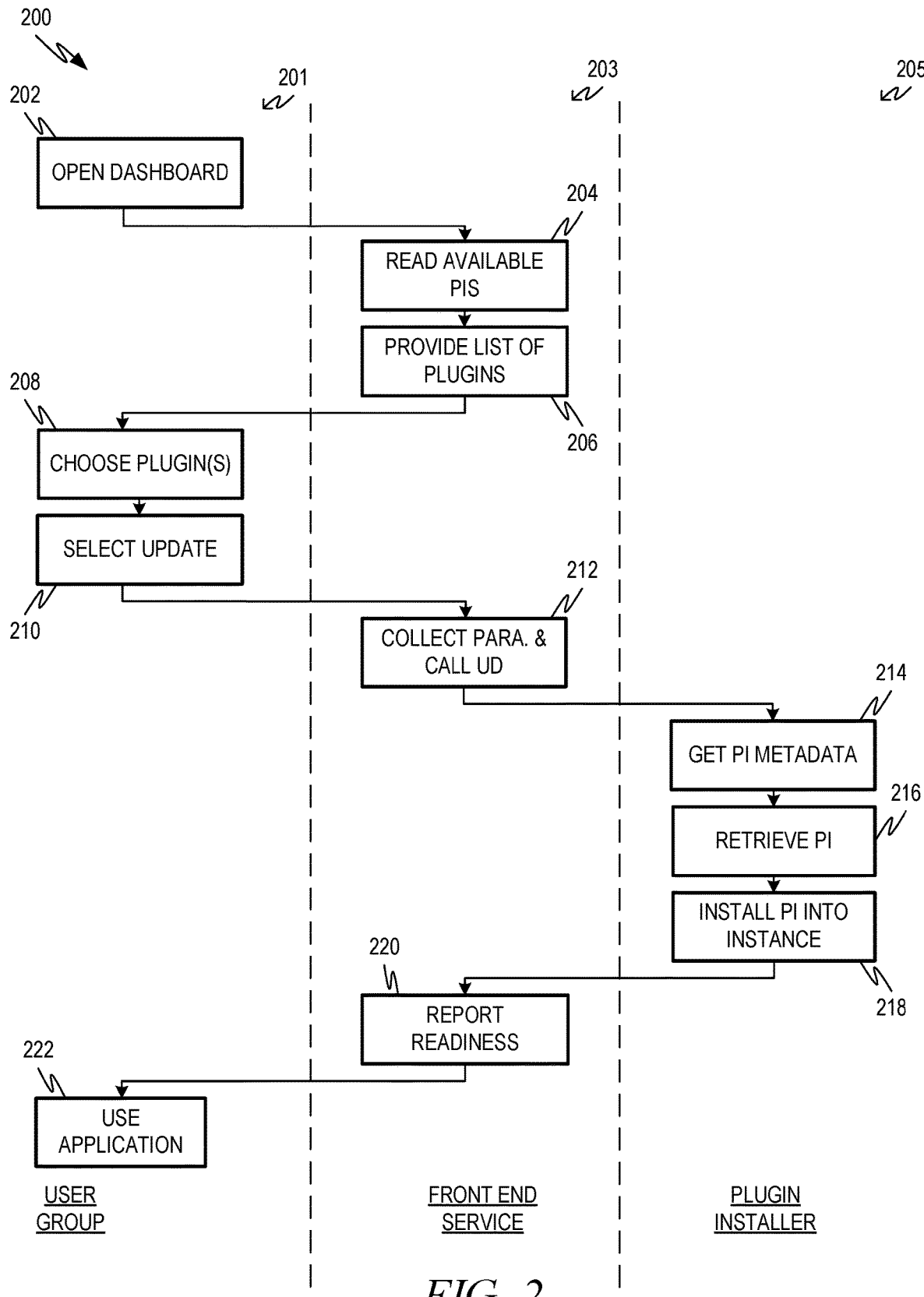
FIG. 2 is a flowchart showing one example of a process flow that may be executed in the environment of FIG. 1 to install or upgrade a plugin at the application instance.

FIG. 2 is a flowchart showing one example of a process flow 200 that may be executed in the arrangement 100 to install or upgrade a plugin at the application instance 122. It will be appreciated that although FIG. 2 is described with respect to the application instance 122 and user group 114, the process flow 200 could also be performed for other user groups 116, 118, 120 and with respect to other application instances 124, 126, 128.

The process flow 200 includes three columns 201, 203, 205 with each column including operations that may be executed by a different component of the arrangement 100. The column 201 includes operations that can be performed by the user group 114 or, for example, a single user authorized to make changes on behalf of the user group 114. The column 203 includes operations executed by the frontend service 112. The column 205 includes operations performed by the plugin installer service 131.

At operation 202, the user group 114 (e.g., a representative user) opens an application dashboard. The application dashboard may be any suitable user interface element provided to the user group 114 by the frontend service 112. At operation 204, the frontend service 112 reads available plugins from the plugin catalog 132. This may include retrieving one or more plugin catalog records from the plugin catalog 132. For example, the frontend service 112 may retrieve from the plugin catalog 132 plugin catalog records corresponding to plugins that are associated with the application corresponding to the application instance 122. In some examples, the frontend service 112 may limit its consideration to plugins that are compatible with a version of the application represented by the application instance 122. For example, the frontend service 112 may consider plugin catalog records indicating the version of the application instance 122. Also, in some examples, the frontend service 112 may limit its consideration to plugins that are authorized for use by the user group 114. For example, the frontend service 112 may consider plugin catalog records comprising selector data describing consumer context properties of the user group 114.

At operation 206, the frontend service 112 provides an indication of the available plugins to the user group 114 (e.g., the representative user thereof). This may include, for example, providing a listing of the available plugins at the dashboard. In some examples, providing the list of plugins to the user group 114 includes providing a description of each plugin from its associated plugin catalog record to the user group 114.

At operation 208, the user group 114 chooses a plugin to be installed and, at operation 210, indicates the selected plugin to the frontend service 112, for example, by selecting a user interface button or other input indicating the selected plugin. At operation 212, the frontend service 112 collects parameters for the selected plugin and initiates installation. In some examples, initiating installation includes calling the application orchestration service 104 (e.g., the application updater service 103 thereof). The application orchestration service 104 may, in turn, call the plugin installer service 131 to install the selected plugin. In other examples, the frontend service 112 calls the plugin installer service 131 directly.

At operation 214, the plugin installer service 131, upon receiving a request to install the plugin, accesses the plugin catalog record corresponding to the selected plugin. The plugin catalog record, as described herein, may include an address indicating a location at the plugin storage 134 including one or more files for installing the plugin. The files for installing the plugin may include, for example, one or more executables, one or more library files, one or more OSGI bundles, one or more SQL or other database protocol procedures, etc. The plugin installer service 131 may retrieve the one or more files at operation 216 and may install the plugin at operation 218.

The plugin installer service 131 may install the plugin in various different ways, for example, based on the form of the plugin. Consider an example in which the plugin is or includes a shared library that is to be used by an executable implementing the application instance 122. The plugin installer service 131 may stop the execution of the executable of the application instance 122 within its container. The stopped executable may implement all or a portion of the application instance 122. The plugin installer service 131 modifies the executable to load the shared library upon execution. The plugin installer service 131 stores the shared library at the persistence 130 and/or at another persistence accessible to the application instance 122 upon execution. The plugin installer service 131 may complete the installation of the shared library plugin by restarting the execution of the executable. This may cause the executable to load the shared library, making the plugin available to the user group 114.

Consider another example in which the plugin is or includes a library file, such as a dynamically-linked library, including query language procedures. The query language procedures may be, for example, Structured Query Language (SQL) queries. For example, when the application implemented by the application instance 122 is a database management system application, various plugins may include library files including query language procedures. The plugin installer service 131 may load a library file including query language procedures similar to what is described herein for plugins that include shared libraries.

Consider another example in which the plugin is or includes a code bundle, such as an Open Service Gateway Initiate (OSGi) bundle, JAR file, SQL or other database protocol procedures, or other code bundle that can be added to the application instance 122 to implement the functionality of the plugin. In this example, the plugin installer service 131 may install the plugin by writing the code bundle to persistence 130 and/or to another location where it can be executed with a remainder of the application instance 122.

Consider another example in which the plugin is or includes an independent executable. In this example, the plugin installer may install the plugin by initiating execution of the independent executable, for example, in the same container that includes other components of the application.

Consider another example in which the plugin is or includes microservice for implementing the plugin functionality. In this example, the plugin installer service 131 may install the plugin by initiating execution of the microservice, for example, by initiating a container for executing the microservice.

At operation 220, the plugin installer service 131 may provide the frontend service 112 with an indication when the plugin is installed. The frontend service 112 may, at operation 220, report to the user group 114 that the application instance 122 is ready for use with the plugin installed. The user group 114 may begin to use the application instance 122 at operation 222.

Figure 3:
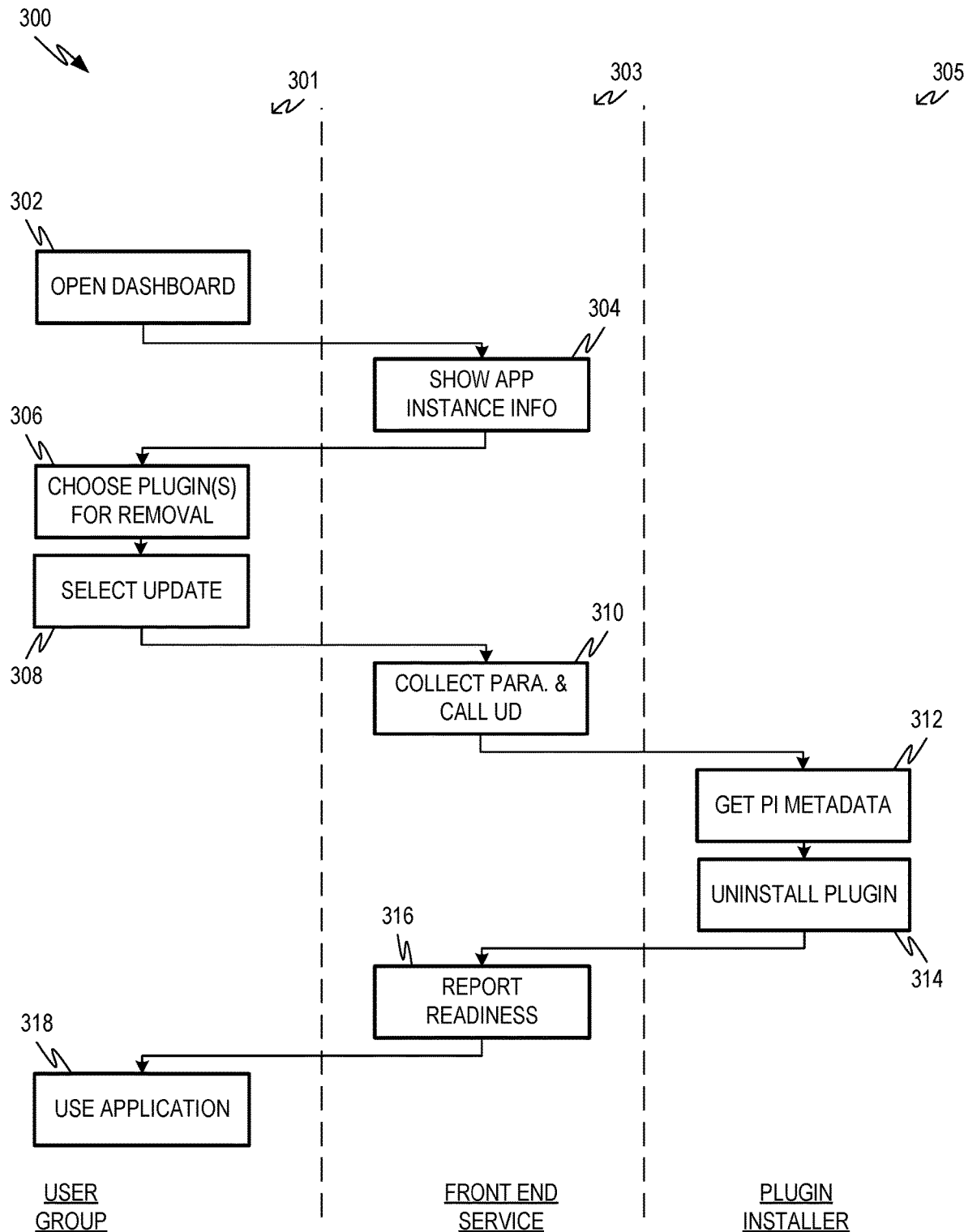
FIG. 3 is a flowchart showing one example of a process flow that may be executed in the environment of FIG. 1 to uninstall a plugin at the application instance.

FIG. 3 is a flowchart showing one example of a process flow 300 that may be executed in the arrangement 100 to uninstall a plugin at the application instance 122. It will be appreciated that although FIG. 2 is described with respect to the application instance 122 and user group 114, the process flow 200 could also be performed for other user groups 116, 118, 120 and with respect to other application instances 124, 126, 128.

The process flow 300 includes three columns 301, 303, 305 with each column including operations that may be executed by a different component of the arrangement 100. The column 301 includes operations that can be performed by the user group 114 or, for example, a single user authorized to make changes on behalf of the user group 114. The column 303 includes operations executed by the frontend service 112. The column 305 includes operations performed by the plugin installer service 131.

At operation 302, the user group 114 (e.g., a representative user) opens an application dashboard. The application dashboard may be any suitable user interface element provided to the user group 114 by the frontend service 112. At operation 304, the frontend service 112 displays information about the application instance 122 to the user group 114. The information displayed may include, for example, a listing of plugins that are installed to the application instance 122. At operation 306, the user group 114 selects a plugin for removal. At operation 308, the user group 114 indicates that the removal should proceed.

At operation 310, the frontend service 112 collects parameters for the selected plugin and initiates removal. In some examples, initiating removal includes calling the application orchestration service 104 (e.g., the application updater service 103 thereof). The application orchestration service 104 may, in turn, call the plugin installer service 131 to remove the selected plugin. In other examples, the frontend service 112 calls the plugin installer service 131 directly.

At operation 312, the plugin installer service 131, upon receiving a request to uninstall the plugin, accesses the plugin catalog record corresponding to the selected plugin. The plugin catalog record may include an identification of the file or files implementing the plugin, which the plugin installer service 131 may use to identify files to be removed in the uninstall of the plugin.

The plugin installer service 131 uninstalls the plugin at operation 314. The manner of uninstalling the plugin may depend on the form of the plugin. For example, if the plugin is a shared library, uninstalling the plugin may include stopping at least one executable of the application instance 122, removing the shared library file, and re-starting the application instance 122. If the plugin is a code bundling, uninstalling the plugin may include removing the code bundle.

The plugin installer service 131 may provide the frontend service 112 with an indication when the plugin is installed. The frontend service 112 may, at operation 316, report to the user group 114 that the application instance 122 is ready for use with the plugin uninstalled. The user group 114 may begin to use the application instance 122 at operation 318.

The use of legacy on-premises plugins in a cloud environment can also create other implementation challenges. For example, as described herein, a legacy on-premises application may execute at a cloud environment in one or more containers, such as a set of containers managed as a cluster by a Kubernetes® orchestration system or other suitable container management system. Whereas adding functionality to a cloud-native application may involve adding or modifying a container-based microservice to the cluster implementing an application instance, installing or uninstalling a plugin to a legacy on-premises application instance may involve making modifications inside an existing container or containers.

Installing a plugin inside the container or containers of an application instance can create various challenges. For example, arranging a mechanism to access a container or cluster of containers may be non-trivial. Further, it is desirable to allow user groups, including customer user groups, to manage plugins at their own application instances. A user group may want to select which plugins to install and uninstall. Further, it may be desirable to provide user groups with this flexibility without providing the user groups with direct access to the container or containers executing the application instance.

This and other challenges can be addressed, in various examples, by the use of plugin containers. Plugin containers may be built from plugin container images that are stored at the cloud environment. A plugin container image may comprise plugin payload data for implementing the plugin. The payload data may include, for example, the executables, libraries, OSGi bundles, and/or other components that are used to implement the plugin. The plugin container image may also include a copy executable. The plugin container image may be a minimal or scratch image that does not include an operating system. To facilitate this, the copy executable may be statically-linked.

To install the plugin, a plugin operator service may implement a plugin installer job. The plugin installer job may be executed, for example, by a container orchestration system, such as a Kubernetes® system. The plugin installer job may implement a shared container file system that is accessible by the various containers that are part of the plugin installer job. The plugin installer job accesses a plugin container image and uses it to start a corresponding container plugin in the plugin installer job. The plugin installer job mounts the plugin container to the shared container file system. When the plugin container is mounted to the shared container file system, the copy executable may be executed. Upon execution, the copy executable transfers the plugin payload data to the shared file system.

The plugin installer job may also execute a plugin deployer container, for example, from a plugin deployer container image. The plugin deployer container may also be mounted to the shard container file system. The plugin deployer container may include one or more executables to retrieve the plugin payload data from the shared file system and install it to one or more containers implementing the application instance. Upon completion of the installation, the plugin installer job may terminate and the shared file system may be deleted.

The example arrangements described herein may provide various advantages. In some examples, because access to the application instance container or containers is limited to the plugin installer job, a plugin installation may be completed without providing user groups, such as customer user groups, with direct access to the application instance.

Also, in some examples, the arrangements described herein may reduce the storage requirements of a container registry for the cloud environment. For example, because the plugin containers are minimal or scratch containers, the cloud environment may not need to store images of operating systems for each plugin container image. For example, plugin container images for different plugins may have the same scratch layers and/or the same copy executables, meaning that the cloud environment may need to store one copy of a scratch layer and one copy of the copy executable independent of the number of plugin container images that are used.

Figure 4:
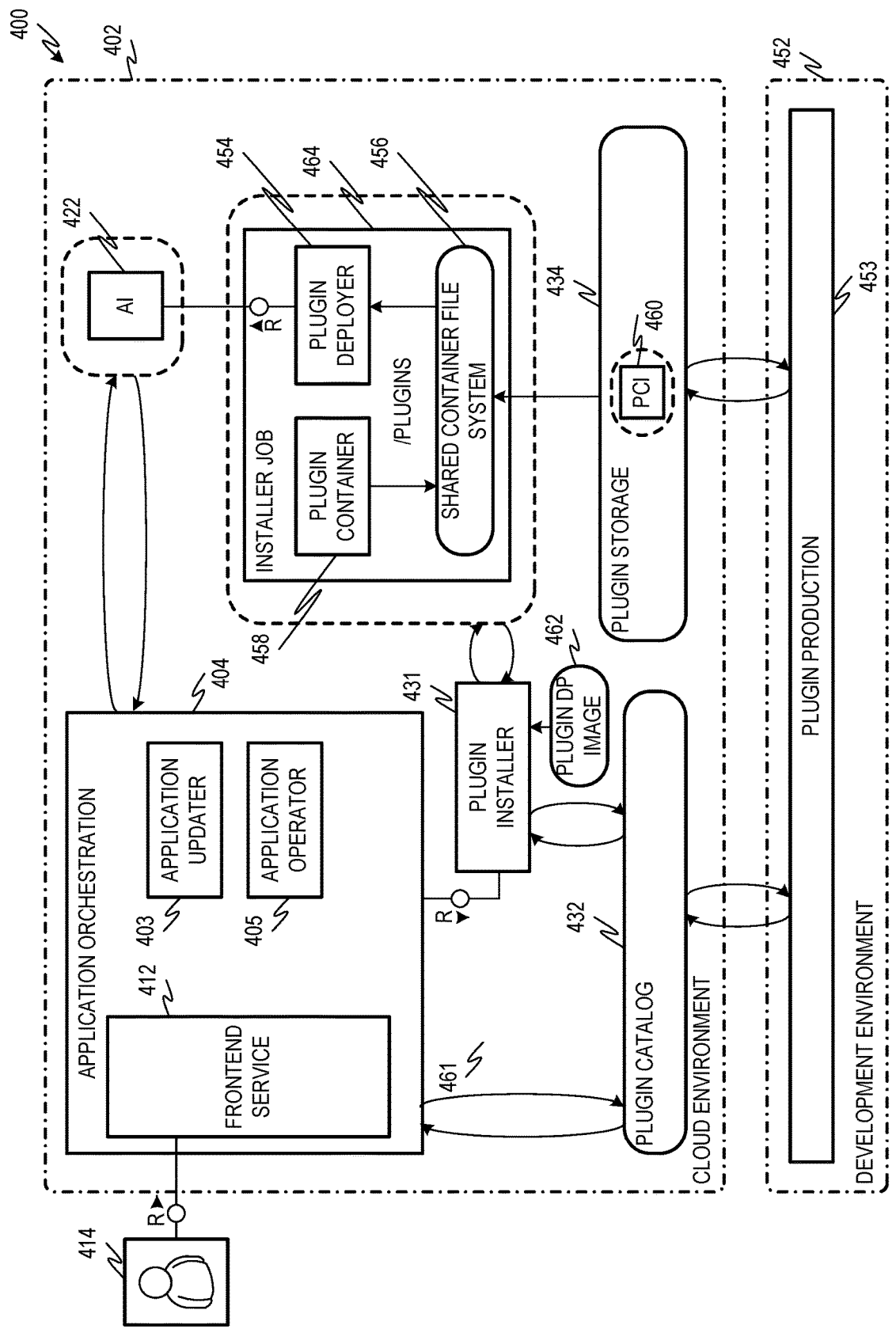
FIG. 4 is a diagram showing one example of an arrangement for installing plugins to legacy on-premises applications executed in a cloud environment.

FIG. 4 is a diagram showing one example of an arrangement 400 for installing plugins to legacy on-premises applications executed in a cloud environment 402. The example cloud environment 402 shown in FIG. 4 shows a single user group 414 and a single application instance 422. It will be appreciated, however, that in some examples, a cloud environment similar to the cloud environment 402 may be arranged with multiple user groups to execute multiple corresponding application instances, for example, as described herein.

Like other cloud environments described herein, the cloud environment 402 may include one or more computing devices, such as servers, for executing the application instance 422 and services 403, 404, 405, 412, and the like. In some examples, the cloud environment 402 is one of a number of cloud environments implemented by a cloud service provider at different geographic locations. For example, the cloud environment 402 may be implemented at a data center or data centers geographically near to the user group 414 so as to minimize network latencies as users associated with the user group 414 access the cloud environment 402. Other cloud environments similar to the cloud environment 402 may be implemented at data centers geographically near to other user groups to provide the application to those user groups.

User group 414 indicates a group of one or more users who use the application instance 422 at the cloud environment 402. The user group 414 may be associated with a stakeholder such as, for example, a group at the entity implementing the cloud environment 402 and/or with a customer entity that purchases access to the software application for the users of the user group 414.

The application instance 422 shown in FIG. 4 is associated with the user group 414. Although, for clarity, FIG. 4 does not show a persistence associated with the application instance 422, it will be appreciated that the application instance 422 may have a persistence as described elsewhere herein. For example, the application instance 422, in some examples, is a database management application such as, for example, the HANA and S/4 HANA systems available from SAP SE of Walldorf, Germany.

The software application provided by the cloud environment 402 of FIG. 4 may be a legacy on-premises application converted for provision by the cloud environment 402. For example, the application may execute as the instance 422 at the cloud environment 402. The instance 422 may comprise one or more containers including executables, libraries, and/or other components for providing the software application. In some examples, containers for executing the application instance 422 are arranged as Kubernetes® clusters.

The cloud environment 402 also executes one or more services 403, 404, 405, 412, 431 for managing execution of the application instance 422. The services 403, 404, 405, 412, 431 may execute at the cloud environment 402 in one or more containers. A frontend service 412 may interface with users of the user group 414. For example, the frontend service 412 may provide users from the user group 414 with a user interface to allow the users to the access application instance 422, to upgrade the application instance 422, as described herein, and/or tin install, upgrade, and/or remove a plugin. Application orchestration services 404 may manage the execution of the application instance 422, for example, in a manner similar to orchestration services 104, 604 described herein. In the example of FIG. 4, the application orchestration services 404 include an application operator service 405 and an application updater service 403, which may operate similar to the application updater service 103 and application operator service 105 of FIG. 1. In the example of FIG. 4, the front end service 412 is included with the application orchestration service 404. It will be appreciated, however, that in some examples, the frontend service 412 may be separate from the application orchestration services 404, for example, as shown in FIG. 4.

The plugin installer service 431 may be in communication with the application orchestration service 404 and/or the frontend service 412 to install, upgrade, and/or remove plugins for the application instance 422. The plugin installer service 431, application orchestration service 404 and/or the frontend service may be in communication with the plugin catalog 432. The plugin catalog 432 is or includes a persistence at the cloud environment 402 storing plugin catalog records describing one or more plugins for the application instance 422.

A plugin catalog record, as described herein, may include various information about a plugin including, for example, a name of the plugin, a description of the plugin, the application associated with the plugin, a version of the plugin, and an address indicating the location of a file or files for implementing the plugin at a plugin storage 434. In some examples, the plugin storage 434 is or includes a container registry including one or more plugin container images, such as the example plugin container image 460 shown in FIG. 4.

Figure 5:
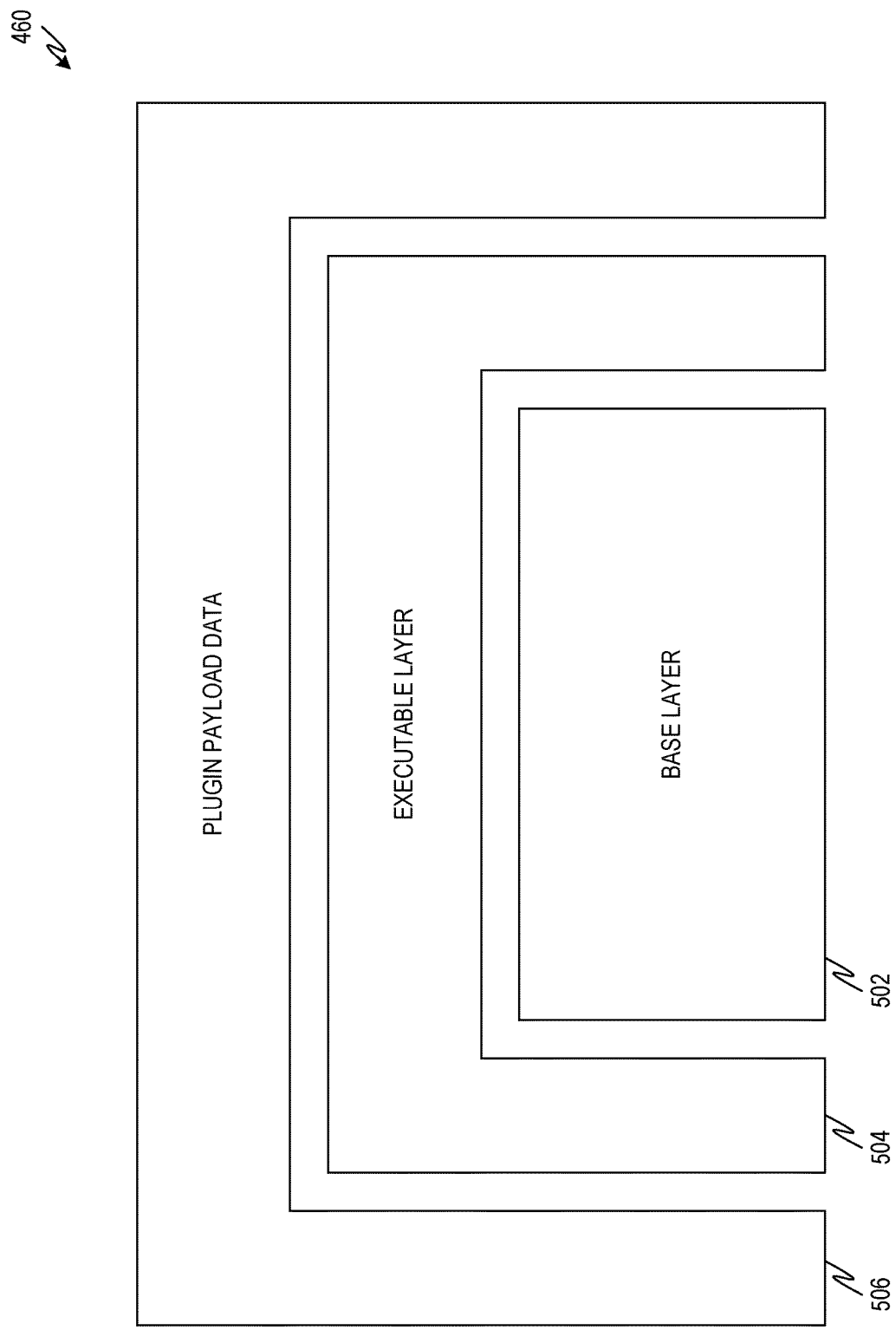
FIG. 5 is a diagram showing one example arrangement of the plugin container image.

FIG. 5 is a diagram showing one example arrangement of the plugin container image 460. The plugin container image 460 may be arranged according to any suitable format such as, for example, the Docker® image format. The plugin container image 460 includes an image base layer 502, an executable layer 504, and a plugin payload layer 506.

In this example, the plugin container image 460 is built from scratch. For example, the base layer 502 of the plugin container image may be an empty file system with no operating system. The executable layer 504 may include one or more executables used to install the plugin, as described herein. For example, the plugin base layer may include a copy executable, described in more detail herein. In some examples, the plugin base layer 504 also includes additional executables such as, for example, a security executable for checking security aspects of the plugin and/or the installation process. Also, in some examples, a scanning executable may be included to scan the plugin payload data for errors.

The one or more executables at the executable layer 504 may be stored at the root of the empty file system of base layer 502. Also, the one or more executables at the executable layer 504 may be statically-linked. For example, the one or more executables may be arranged to execute without relying on libraries, services, or other resources provided by an operating system and/or from other files. In this way, the one or more executables may execute in a container launched from the plugin container image 460, which may not include an operating system, as described herein.

The plugin payload layer 506 includes plugin payload data. The plugin payload data may be the data used to install the plugin at the application instance 422. For example, the plugin payload layer 506 may include one or more executables for implementing the plugin, one or more libraries or OSGi bundles for implementing the plugin, one or more SQL or other database protocol procedures for implementing the plugin, and/or the like. In some examples, the plugin payload data includes data that could be installed at an on-premises implementation of the application to provide the plugin.

The structure of the plugin container image 460 may reduce the storage requirements at the plugin storage 434 and, for example, the plugin registry thereof. For example, all or a number of plugins having respective plugin container images stored at the plugin storage 434 may use the same base layer 502 and executable layer 504. Accordingly, the plugin storage 434 may only store one example of the base layer 502 and executable layer 504. When a plugin container image is requested for a particular plugin, the plugin storage 434 may retrieve the common base layer 504 and executable layer 506 along with the plugin-specific plugin payload data layer 506.

When a user from the user group 414 requests that a plugin be installed, the application orchestration services 404 may call the plugin installer service 431 to install the plugin. The plugin installer service 431 may launch a plugin installer job 464. The plugin installer job 464 may be, for example, a job arranged according to the container management arrangement, such as one or more Kubernetes® jobs. The plugin installer service 431 retrieves a reference to the plugin deployer image 462 and provides the reference of the plugin deployer image 462 to the plugin installer job 464. The plugin deployer image 462 includes an installer executable or command that can be started by the plugin installer job 464, as described herein.

The plugin installer job 464 further retrieves the appropriate plugin container image 460 and plugin deployer image 462. The plugin container image 460 may be accessed from the plugin storage 434. The installer job 464 may initiate a shared container file system 456. The shared container file system 456 may be accessible from within the plugin installer job 464 and may be eliminated when the plugin installer job 464 completes. In some examples, the installer job 464 may initiate a pod, or set of related containers including the plugin container 458 and the plugin deployer container 454. The containers 458, 454 of the pod can communicate with one another and may be able to access the shared container file system 456.

The plugin installer job 464 may use the plugin container image 460 to start a plugin container 458 within the plugin installer job 464. The plugin installer job 464 may mount the plugin container 458 to the shared container file system 456 and prompt the execution of the copy executable from the plugin container image 460. The copy executable may copy the plugin payload data from the plugin container 458 to the shared container file system 456.

The plugin installer job 464 may also launch a plugin deployer container 454 from the plugin deployer container image 462. Upon starting the plugin deployer container 454, the plugin installer job 464 initiates the installer executable at the plugin deployer container 454. The installer executable may be configured to access one or more containers that are used to implement the application instance 422. The plugin deployer container 454 (e.g., the installer executable) may access a container or pod of containers implementing the application instance 422 and move the plugin payload data from the shared container file system 456 to one or more of the containers implementing the application instance 422, thus installing the plugin. After the plugin is installed, the plugin installer job 464 may terminate, causing the containers 458, 454 and shared container file system 456 to also terminate.

FIG. 4 also includes a development environment 452 comprising a plugin production system 453. The plugin production system 453 may be utilized by one or more users (e.g., of the user group 414 or another user group) to generate plugins for the application. For example, when a plugin is added, the plugin production system 453 may add a plugin catalog record for the new plugin to the plugin catalog 432 and may provide a plugin container image for the plugin to the plugin storage.

Figure 6:
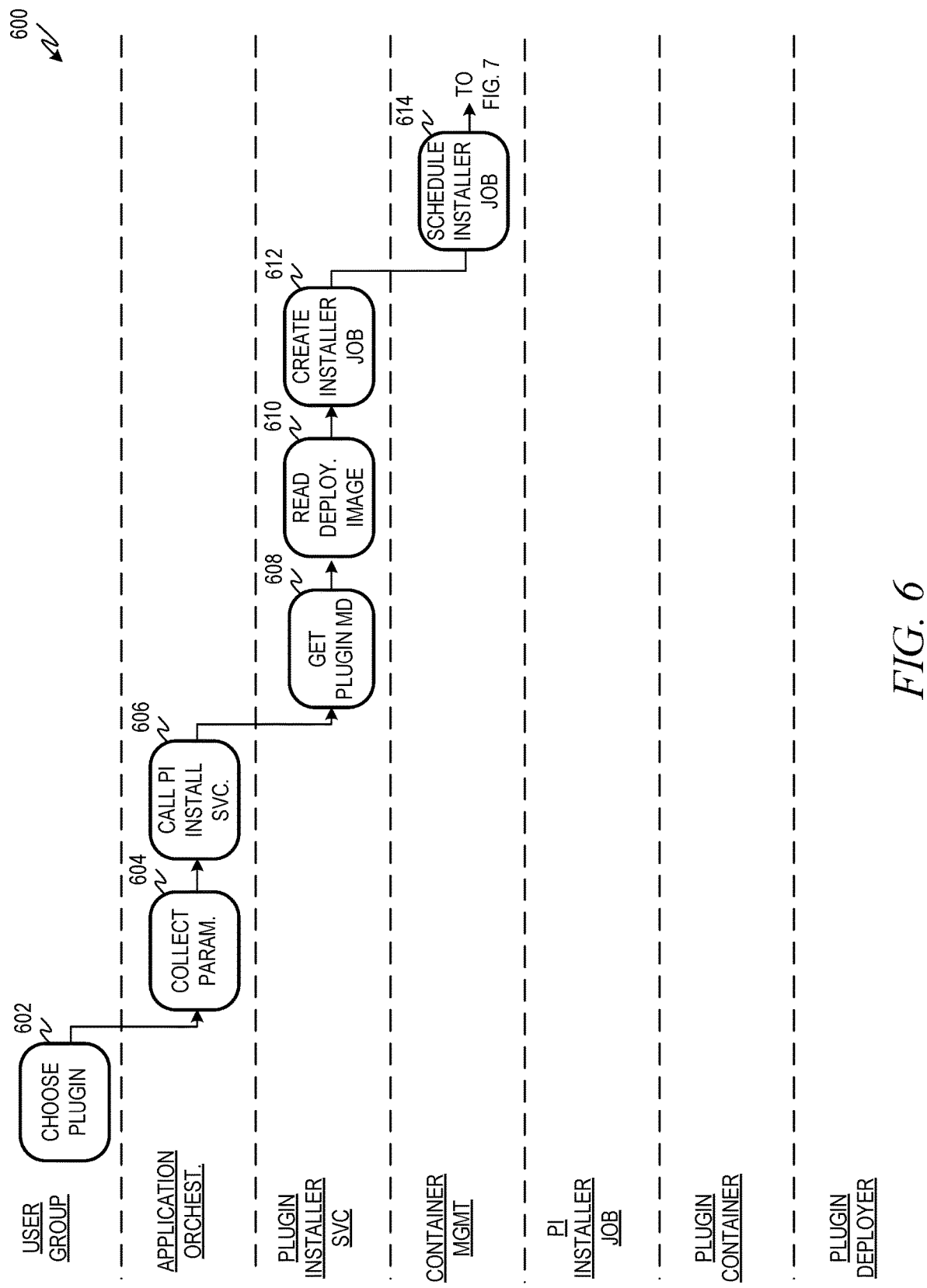
FIGS. 6-8 are a flowchart showing one example of a process flow 600 that may be implemented in an arrangement, such as the arrangement of FIG. 4, to install a plugin to an application instance.
Figure 7:
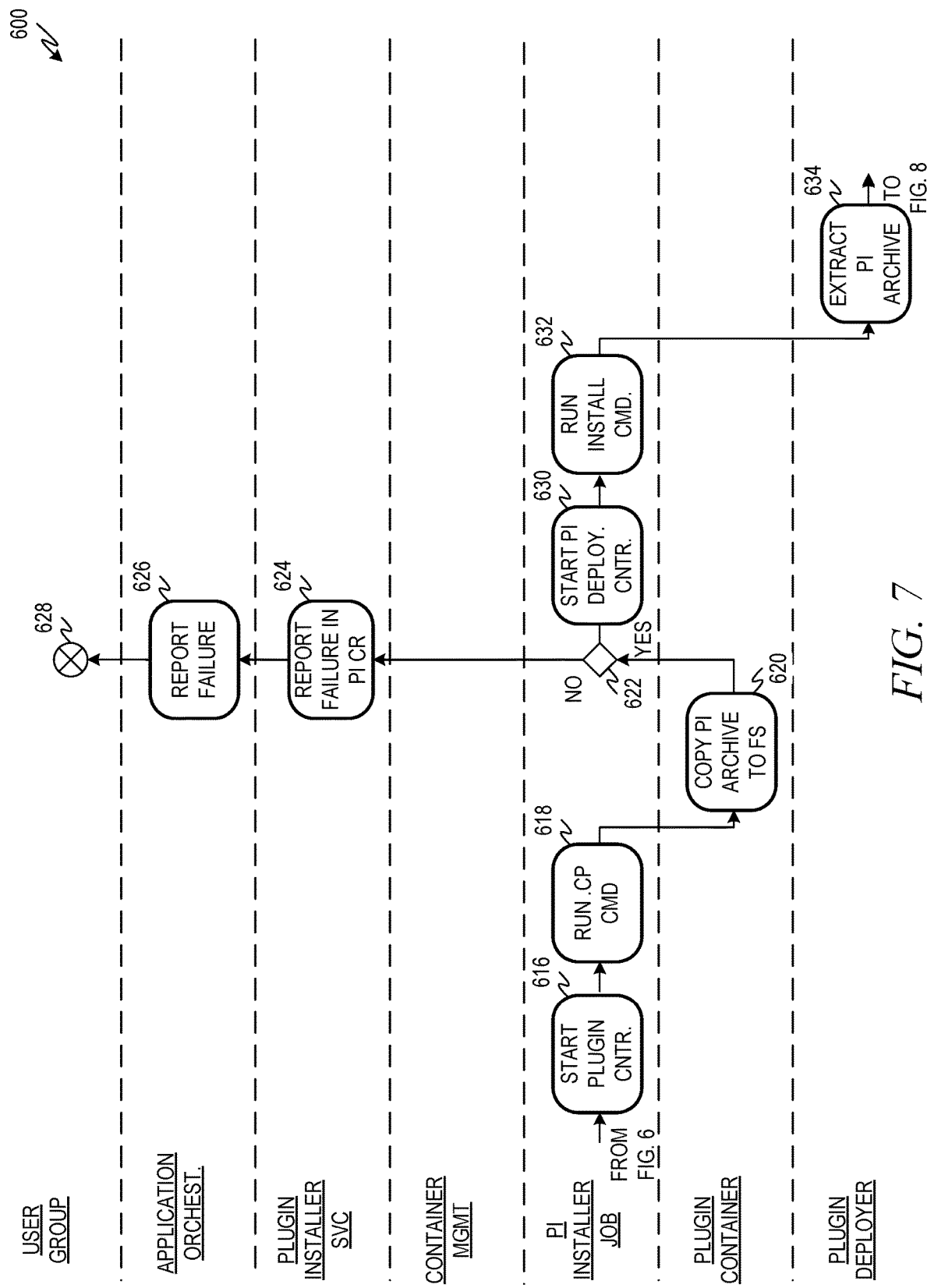
Figure 8:
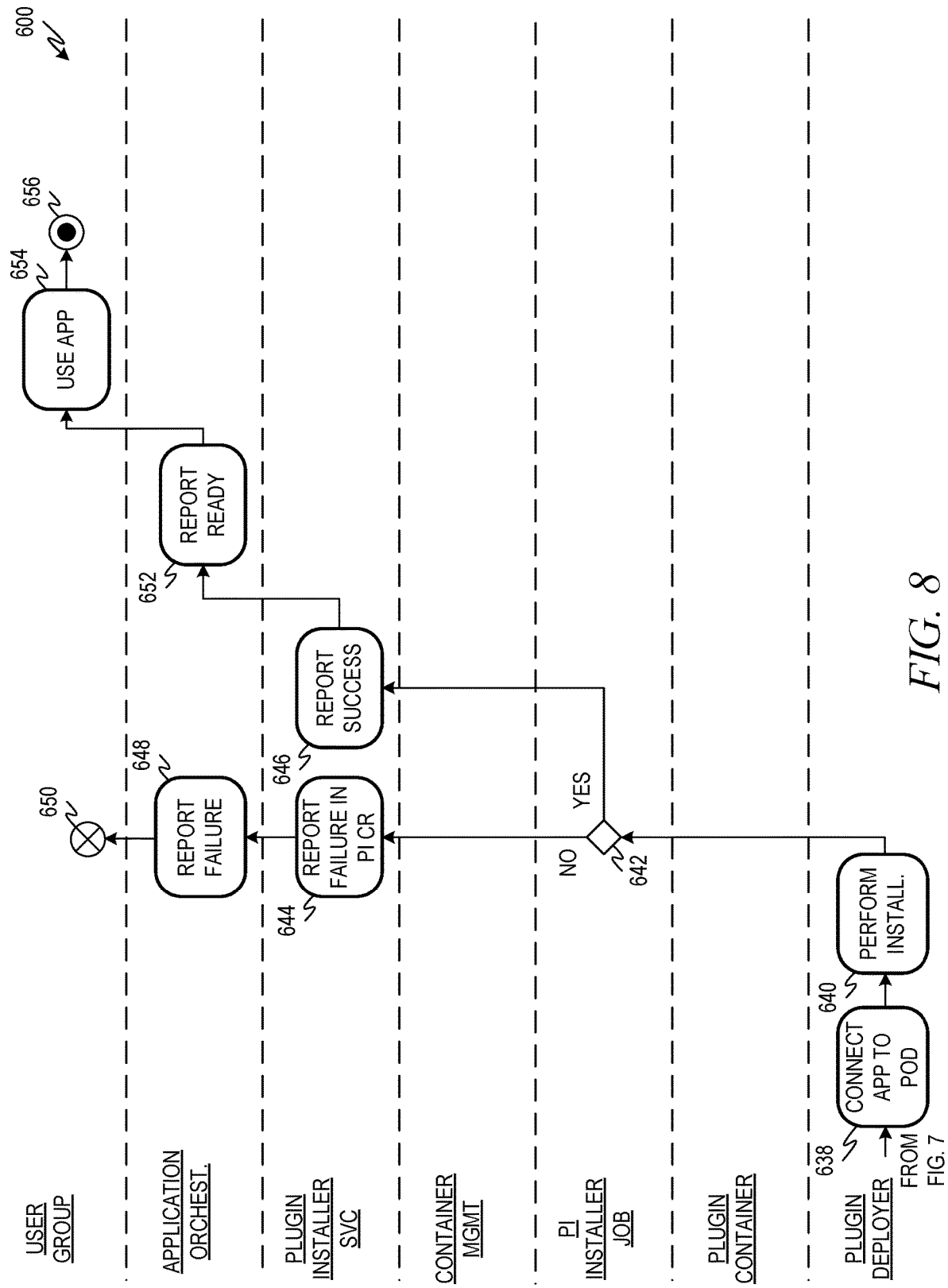

FIGS. 6-8 are a flowchart showing one example of a process flow 600 that may be implemented in an arrangement, such as the arrangement 400 of FIG. 4, to install a plugin to an application instance. The process flow 600 is illustrated using seven rows. A row, labeled "User Group" includes operations that may be performed by the user group 414 (including one or more users thereof). A user group or users may perform operations, for example, via one or more user computing devices. A row labeled "Application Orchestration" includes operations that may be performed by an application orchestration service, such as, for example, the frontend service 412, application operator service 403, and/or application operator service 405. A row labeled "Plugin Installer Svc" includes operations that may be performed by the plugin installer service 431. A row labeled "Container Management" includes operations that may be performed by a container management system, such as a Kubernetes® orchestration system or similar system. In some examples, the container management system is implemented by the application orchestration service 404. A row called "PI Installer Job" includes operations that may be performed by the plugin installer job 464. A row called "Plugin Container" includes operations that may be performed by the plugin container 458. A row called "Plugin Deployer" includes operations that may be performed by the plugin deployer container 454.

At operation 602, the user group 414 selects a plugin to be installed to the application instance 422. For example, the frontend service 412 may query the plugin catalog 432 to determine available plugins that are compatible with the application instance 422. At operation 604, the application orchestration services 404 collect parameters for the selected plugin. This may include, for example, retrieving the plugin catalog record for the selected plugin including, for example, a location of the plugin container image 460 for the plugin at the plugin storage 434. At operation 606, the application orchestration services 404 calls the plugin installer service 431 to install the plugin.

At operation 608, the plugin installer service 431 accesses plugin metadata for installing the plugin. This may include, for example, the plugin catalog record for the plugin and/or the type or version of the application with which the plugin is compatible. At operation 610, the plugin installer service 431 reads the reference to the plugin deployment container image 462. At operation 612, the plugin installer service 431 creates the plugin installer job 464. The container management system schedules the plugin installer job 464 at operation 614.

Moving to FIG. 7, the plugin installer job 464 starts the plugin container 458 at operation 616. Staring the plugin container 458 may include, for example, mounting the plugin container 458 to the shared container file system 456. At operation 618, the plugin installer job 464 runs the copy executable from the plugin container 458. At operation 620, the plugin container 458 (e.g., the copy executable thereof) copies the plugin payload data to the shared container file system 456. At operation 622, the plugin installer job 464 determines if the copying of the plugin payload data was successful. If the copying of the plugin payload data was not successful, the plugin installer service 431, at operation 624, reports the failure to the application orchestration services 404, which report the failure to the user group at operation 626. The process flow 600 may terminate at operation 628.

If the copying is successful at operation 622, the plugin installer job 464 may start the plugin deployer container 454 from the plugin deployment container image 462 at operation 630. At operation 632, the plugin installer job 464 initiates the installer executable at the plugin deployer container 454. At operation 634, the plugin deployer container 454 (e.g., the installer executable thereof) extracts the plugin payload data from the shared container file system 456. At operation 638, the plugin deployer container 454 (e.g., the installer executable thereof) connects the pod implemented by the plugin installer job 464 to the application instance 422.

At operation 640, the plugin deployer container 454 (e.g., the installer executable thereof) installs the plugin to the application instance 422. This may include, for example, copying the plugin payload data from the shared container file system 456 to at least one container implementing the application instance 422. Consider an example in which the plugin payload data includes one or more libraries. The plugin deployer container 454 (e.g., the installer executable thereof) may copy the one or more libraries to one or more containers implementing the application instance 422. Consider an example in which the plugin payload data includes an executable. The plugin deployer container 454 (e.g., the installer executable thereof) may copy the executable to one or more containers implementing the application instance 422 and may initiate execution of the executable. Consider another example in which the plugin payload data includes SQL or other database protocol procedures. The plugin deployer container 454 (e.g., the installer executable thereof) may copy the protocol procedures to an appropriate location at one or more containers implementing the application instance. In some examples, installing the plugins to the application instance 422 includes re-starting the application instance.

At operation 642, the plugin installer job 464 determines if the installation at operation 640 was successful. If the installation is not successful, the plugin installer service 431 reports the failure to the application orchestration services 404 at operation 644. The application orchestration services 404 report the failure to the user group 414 at operation 648 and the process flow 600 may terminate at operation 650.

If the installation is successful, the plugin installer service 431 may report the success to the application orchestration services 404 at operation 646. The application orchestration services 404, ate operation 652 may report to the user group 415 that the application instance 422 is ready to use. The user group 414 may use the application instance 422 with the installed plugin at operation 654 and the process flow 600 may end at operation 656.

Another difficulty encountered when utilizing legacy on-premises plugins in a cloud environment is related to compatibility. For example, while the microservices of a cloud native application may be interoperable according to a defined API, legacy on-premises plugins may have limited compatibility with application instances. Some plugins may be compatible only with a single version or build of the application. Other plugins may be compatible only with a particular range of versions or builds of the application.

In an on-premises installation, limited version compatibility of plugins may not cause significant problems. For example, the user group implementing an on-premises computing system is aware of the version of the application executing at the on-premises computing system and can select plugins accordingly. If the user group decides to upgrade or change the version of the application executing at the on-premises computing system, it may also make any necessary upgrades to plugins.

In a cloud environment, on the other hand, the exact build of an application instance may be obscured to the user groups utilizing it. For example, the provider of the cloud environment may wish to maintain freedom to modify the build or version of an application instance executing for a user group, for example, to patch the application, fix a security issue, and/or the like. When the provider of the cloud environment makes such a change, however, it may break any plugins that the user group has installed to the application instance.

These and other issues may be addressed utilizing a plugin catalog service. The plugin catalog service may be called by a plugin installer service or other suitable service when a plugin is to be installed. The plugin catalog service may determine a build version of the application instance to which the plugin is to be installed. Using plugin catalog records from a plugin catalog, the plugin catalog service determines a set of plugins that are compatible with the build of the application instance.

The plugin catalog service may also be used, for example, when the build version of an application instance is to change. For example, when the provider of a cloud environment is to modify the build version of an application instance, it may utilize the plugin catalog service to determine which, if any, installed plugins are incompatible with the target build version. If any plugins are incompatible with the target build version, the plugin catalog service may provide indications of replacement plugins that are compatible with the target build version. The provider may install the replacement plugins during or in conjunction with the installation of the target build version. In various examples, this may occur in a manner that is transparent to the user group.

Figure 9:
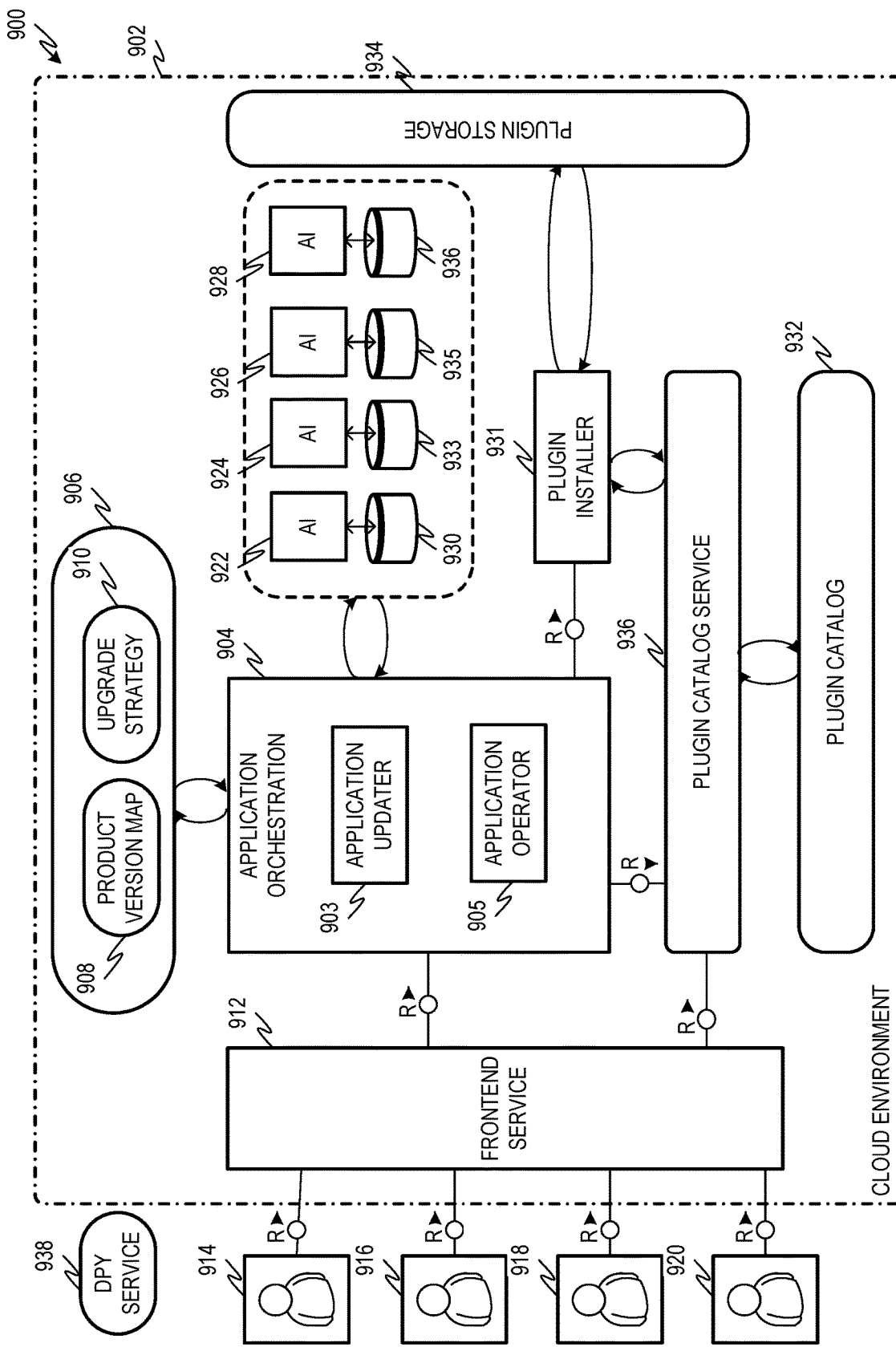
FIG. 9 is a diagram showing one example of an arrangement for managing plugins at legacy on-premises applications executed in a cloud environment.

FIG. 9 is a diagram showing one example of an arrangement 900 for managing plugins at legacy on-premises applications executed in a cloud environment 902. The cloud environment 902 executes one or more application instances 922, 924, 926, 928 and various services 912, 904 to provide an application, such as a database management system application, to one or more user groups 914, 916, 918, 920.

The cloud environment 902 may include one or more computing devices, such as servers, for executing the application instances 922, 924, 926, 928 and services 912, 904. In some examples, the cloud environment 902 is one of a number of cloud environments implemented by a cloud service provider at different geographic locations. For example, the cloud environment 902 may be implemented at a data center or data centers geographically near to the user groups 914, 916, 918, 920 so as to minimize network latencies as the user groups 914, 916, 918, 920. Other cloud environments similar to the cloud environment 902 may be implemented at data centers geographically near to other user groups to provide the application to those user groups.

User groups 914, 916, 918, 920 indicate groups of one or more users who use applications instances 922, 924, 926, 928 at the cloud environment 902. Each user group 914, 916, 918, 920, in some examples, is associated with a stakeholder. Stakeholders may be internal stakeholders of an entity providing the software application such as, for example, QA or testing groups. Stakeholders may also include customer entities who purchase access to the software application.

User groups 914, 916, 918, 920 may be associated with one or more application instances 922, 924, 926, 928. For example, the user group 914 may be associated with application instance 922. The user group 916 may be associated with the application instance 924. The user group 918 may be associated with application instance 926. The user group 920 may be associated with application instance 928, and so on. In some examples, a user group 914, 916, 918, 920 may be associated with more than one instance of the application. For example, a user group 914, 916, 918, 920 may execute an instance of the application for a production implementation and another instance or instances of the application for a testing or evaluation use.

The cloud environment 902 also implements persistencies 930, 933, 935, 936. For examples, when the application instances 922, 924, 926, 928 implement a database management system, the persistencies 930, 933, 935, 936 may store data managed by the database management system application. The persistencies 930, 933, 935, 936 may be implemented using any suitable data storage device or devices such as, for example, one or more disks, one or more solid state drives, one or more random access memories, etc. In some examples, the software application implemented at the cloud environment 902 is a database management system application for an in-memory database such as, for example, the HANA® and S/4 HANA® systems available from SAP SE of Walldorf, Germany.

A persistency 930, 933, 935, 936 may be associated with a user group. In the example of FIG. 9, the persistency 930 is associated with user group 914. The persistency 933 is associated with user group 916. The persistency 935 is associated with the user group 918; and the persistency 936 is associated with the user group 920 and so on. In some examples, a single user group 914, 916, 918, 920 may be associated with more than one persistency. For example, a user group 914, 916, 918, 920 may maintain one persistency for a production implementation of the software application and another persistency for a test or evaluation implementation of the software application.

The software application provided by the cloud environment 902 of FIG. 9 may be a legacy on-premises application converted for provision by the cloud environment 902. For example, the application may execute as various instances 922, 924, 926, 928. Each application instance may comprise one or more containers including executables, libraries, and/or other components for providing the software application. In some examples, instances 922, 924, 926, 928 may be associated with respective persistencies 930, 933, 935, 936 as shown. In some examples, containers for executing the various application instances 922, 924, 926, 928 are arranged as Kubernetes® clusters.

The cloud environment 902 also executes one or more services 904, 912 for managing execution of the application instances 922, 924, 926, 928. The services 904, 912 may execute at the cloud environment 902 in one or more containers. A frontend service 912 may interface with the various user groups 914, 916, 918, 920. For example, the frontend service 912 may provide users from various user groups 914, 916, 918, 920 with a user interface to allow the users to access application instances 922, 924, 926, 928 that are executing and/or to launch new application instances. In some examples, the frontend service 912 provides users from the various user groups 914, 916, 918, 920 with data about available target versions to which the user groups' own executing instances 922, 924, 926, 928 can be upgraded, as described herein.

Application orchestration services 904 may manage the execution of the application instances 922, 924, 926, 928. The application orchestration service 904 may be implemented as a single service and/or as a set of one or more subservices. In the example of FIG. 9, the application orchestration services 904 include an application operator service 905 and an application updater service 903.

The application operator service 905 may manage the execution of the one or more containers implementing an application instance 922, 924, 926, 928. For example, the application operator service 905 may begin the execution of one or more containers for implementing an application instance 922, 924, 926, 928, for example, from on one or more container images associated with the one or more containers. Also, if one or more containers associated with an application instance 922, 924, 926, 928 crash, the application operator service 905 may spin up a replacement for the crashed container or containers. The application updater service 903 may manage application versions.

In the example of FIG. 9, the version metadata 906 includes a product version map 908. The product version map 908 includes data describing available versions of the application. In some examples, the data describing a version may include release cycle data describing a maturity level of a version. For example, the release cycle data may indicate a level of testing and development to which the version has been subjected. Release cycle data may also indicate a frequency at which new versions are released. For example, a version may represent a monthly release, a bi-weekly release, or any other suitable release period. The product version map 908 may also include track data for one or more versions. The track data may indicate a status or upgrade track of the version and may be associated with a generally-available or production version. For example, the most recently-released quarterly version may be associated with a "latest" track. One or more previously-released versions may be associated with a "maintenance" track indicating that the version is not the latest but is still maintained.

An example product version map 908 is given by EXAMPLE 2 below:

EXAMPLE 2 apiVersion: feature.example.com/v1alpha1
kind: ProductVersion
metadata:
  name: APPLICATION 1
spec:
  enablement:
    rolloutstrategy: staged-APP1-rollout
  versions:
    id: 2019.32.10
      name: APP1 Cloud Edition 2019.32
      releaseCycle: generally-available-quarterly
      track: 2019.32
      version:
        image-host: <container-registry>
        image-name: <container-repo>/APP1-k8s
        image-tag: 2019.32.10
        build-id: <APP1-build-id-1>
        expiration-date: "2019-11-02"
    id: 2019.34.7
      name: APP1 Cloud Edition 2019.34
      releaseCycle: generally-available-biweekly
      track: 2019.34.7
      id: 2019.34.7
      version:
        image-host: <container-registry>
        image-name: <container-repo>/APP1-k8s
        image-tag: 2019.34.7
        build-id: <APP1-build-id-3>
        expiration-date: "2019-04-02"

EXAMPLE 2 shows an example product version map 908 for an application called APPLICATION 1. The example product version map 908 shown in EXAMPLE 2 may represent the entirety of a product version map and/or may be a version map record for APPLICATION 1 retrieved from a product version map having product version map records for multiple different applications. The example product version map 908 indicates that APPLICATION 1 is subject to a staged rollout. The example product version map 908 also indicates two example versions called APP1 Cloud Edition 2019.32 and APP1 Cloud Edition 2019.34. In EXAMPLE 2, each version is further described by a unique identifier, a release cycle, track, container image location, container image name, and build identifier.

The release cycle indicated for each version describes a maturity level of the version. For example, the version APP1 Cloud Edition 2019.32 is indicated to be a "generally available quarterly" version while the version APP1 Cloud Edition 2019.34 is indicated to be a "generally-available-biweekly" version. The "generally-available-quarterly" maturity level may indicate a release cycle of the application that includes a new generally-available version each quarter. The "generally-available-biweekly" maturity level may indicate a release cycle of the application that includes a new generally-available version every other week. Other example versions may be "evaluation" or "early adoption" versions. An "evaluation" or "early adoption" version may be at a maturity level that is suitable for user groups 914, 916, 918, 920 who desire to receive early or pre-release versions of the application, for example, for evaluation or testing.

Version metadata 906 may also include an upgrade strategy map 910. The upgrade strategy map 910 describes allowable upgrades from various versions of the application. For example, the upgrade strategy map 910 may comprise upgrade strategy records, where each upgrade strategy record indicates a source version of the application and one or more target versions (if any) to which the source version may be upgraded.

In some examples, the application orchestration service 904 (e.g., via the application updater service 903 and/or application operator service 905) reads the version metadata 906 and prepares application instances 922, 924, 926, 928 for upgrading. For example, the application orchestration service 904 (e.g., via the application operator service 905) may utilize the product version map 908 and upgrade strategy map 910 to determine the available upgrades for the various application instances 922, 924, 926, 928. This may include determining the version and/or maturity level and upgrade track (if any) of an application instance 922, 924, 926, 928 and then determining, from the upgrade strategy map 910, any upgrades that are available from that maturity level and upgrade track (if any).

The application orchestration service 904 (e.g., application operator service 905) may then consult the product version map 908 to determine the linked container images and version numbers associated with the target versions of each available upgrade. These may be written to a location accessible to the application orchestration service 904 (e.g., the application updater service 903 thereof), which may utilize the indicated target versions to respond to an upgrade request from a user group 914, 916, 918, 920. When an upgrade request is received, the application orchestration service 904 (e.g., the application updater service 903) may spin up a new version of the requested target version.

In some examples, instead of pre-figuring the target versions from a particular application instance 922, 924, 926, 928, the application orchestration service (e.g., the application operator service 905) may consult the version metadata 906 to determine available upgrades and target versions upon receiving a request for an upgrade from a user group 914, 916, 918, 920.

In some examples, the application orchestration service 904 (e.g., via the application updater service 903 and/or application operator service 905) reads the version metadata 906 when launching an application instance 922, 924, 926, 928. For example, when an application instance is created, it may be annotated with a version record that may be built with data from the product version map 908 and/or upgrade strategy map 910. In some examples, the data annotating an application instance 922, 924, 926, 928 may be stored at a custom resource implemented using a container orchestration system for the cloud environment 902, such as the Kubernetes® container orchestration system. EXAMPLE 3 below shows an example version record for an application instance 922, 924, 926, 928:

EXAMPLE 3

```
apiVersion: APPLICATION 1.example.com/v1alpha1
kind: APPLICATION 1
metadata:
    name: APPLICATION 1-sample
spec:
    product-version:
        releaseCycle: generally-available-quarterly
        track: 2019.32
    . . .
status:
    current-product-version:
        name: HostApplication Cloud Edition 2019.32
        releaseCycle: generally-available-quarterly
        track: 2019.32
        id: 2019.32.10
        version:
            image-host: <docker-registry>
            image-name: <docker-repo>/host-application-k8s
            image-tag: 2019.32.10
            build-id: <APPLICATION 1-build-id-1>
        expiration-date: "2019-11-02"
##111
```

The arrangement 900 of FIG. 9 also includes a deployment service 938. The deployment service 938 may execute at one or more computing devices, such as computing devices implemented by the cloud service provider that implements the cloud environment 902. In some examples, the deployment service 938 is executed at the same computing devices that implement the environment 902. The deployment service 938 may be programmed to launch the cloud environment 902, for example, as part of a CI/CD pipeline. In some examples, the deployment service 938 may also be used to update the metadata 906, for example, as described herein. For example, the CI/CD pipeline may be used to generate new versions, patches, etc. for the application instances 922, 924, 926, 928. When the deployment service 938 deploys new version, patch, upgrade, or the like, it may also make appropriate upgrades to the metadata 906.

The cloud environment 902 may also include a plugin installer service 931, plugin catalog service 936, plugin catalog 932, and plugin storage 934. The plugin installer service 931 may be in communication with the application orchestration service 904 and/or the frontend service 912 to install, upgrade, and/or remove plugins for the application instances 922, 924, 926, 928. The plugin installer service 931, application orchestration service 904 and/or the frontend service may be in communication with the plugin catalog 932, for example, via the plugin catalog service 936. The plugin catalog 932 is or includes a persistence at the cloud environment 902 storing plugin catalog records describing one or more plugins for the application instance 922. In some examples, the plugin storage 934 is or includes a container registry including one or more plugin container images, such as the example plugin container image 460 shown in FIG. 4.

The plugin catalog 932 may include plugin catalog records describing various available plugins. A plugin catalog record, as described herein, may include various information about a plugin including, for example, a name of the plugin, a description of the plugin, the application associated with the plugin, a version of the plugin, and an address indicating the location of a file or files for implementing the plugin at a plugin storage 934. In some examples, a plugin catalog record may also include an indication of a build version or versions with which the plugin ins compatible. An example plugin catalog record for an example plugin is given by EXAMPLE 4 below:

EXAMPLE 4

```
apiVersion: feature.example.com/v1
kind: ProductPlugin
metadata:
    name: plugin-a
spec:
    type: shared-library
    description: |
        some text that describes the plugin
    extendedProduct: APPLICATION 1
    builds:
        id: <some-unique-build-id>
            location:  /path/to/plugin/in/plugin/storage  pro-
                ductVersionSelector:
                product-version/version/build-id:  <host-appli-
                    cation-build-id-1>
        id: <some-unique-build-id>
            location:  /path/to/plugin/in/plugin/storage  pro-
                ductVersionSelector:
                product-version/version/build-id:  <host-appli-
                    cation-build-id-2>
        id: <some-unique-build-id>
            location:  /path/to/plugin/in/plugin/storage  pro-
                ductVersionSelector:
                product-version/version/build-id:  <host-appli-
                    cation-build-id-3>
```

In EXAMPLE 4, the example plugin is called "plugin-a" and is indicated to be a shared library. The plugin catalog record of EXAMPLE 4 indicates that the plugin is associated with APPLICATION 1. The example plugin catalog record also includes a list of builds of APPLICATION 1 with which the plugin is compatible.

Figure 10:
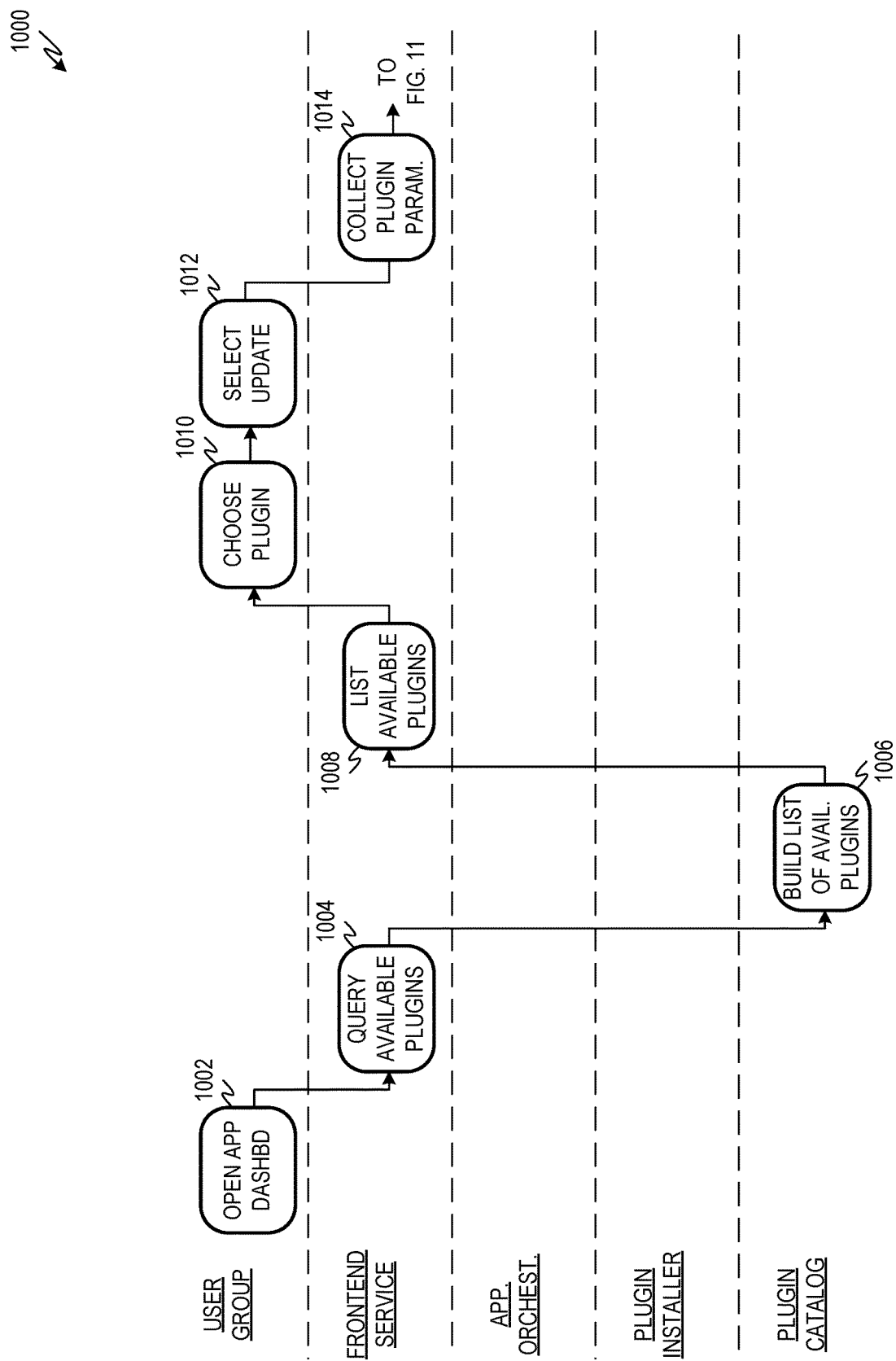
FIGS. 10 and 11 are a flowchart showing one example of a process flow for installing a plugin to an application instance considering version compatibility.
Figure 11:
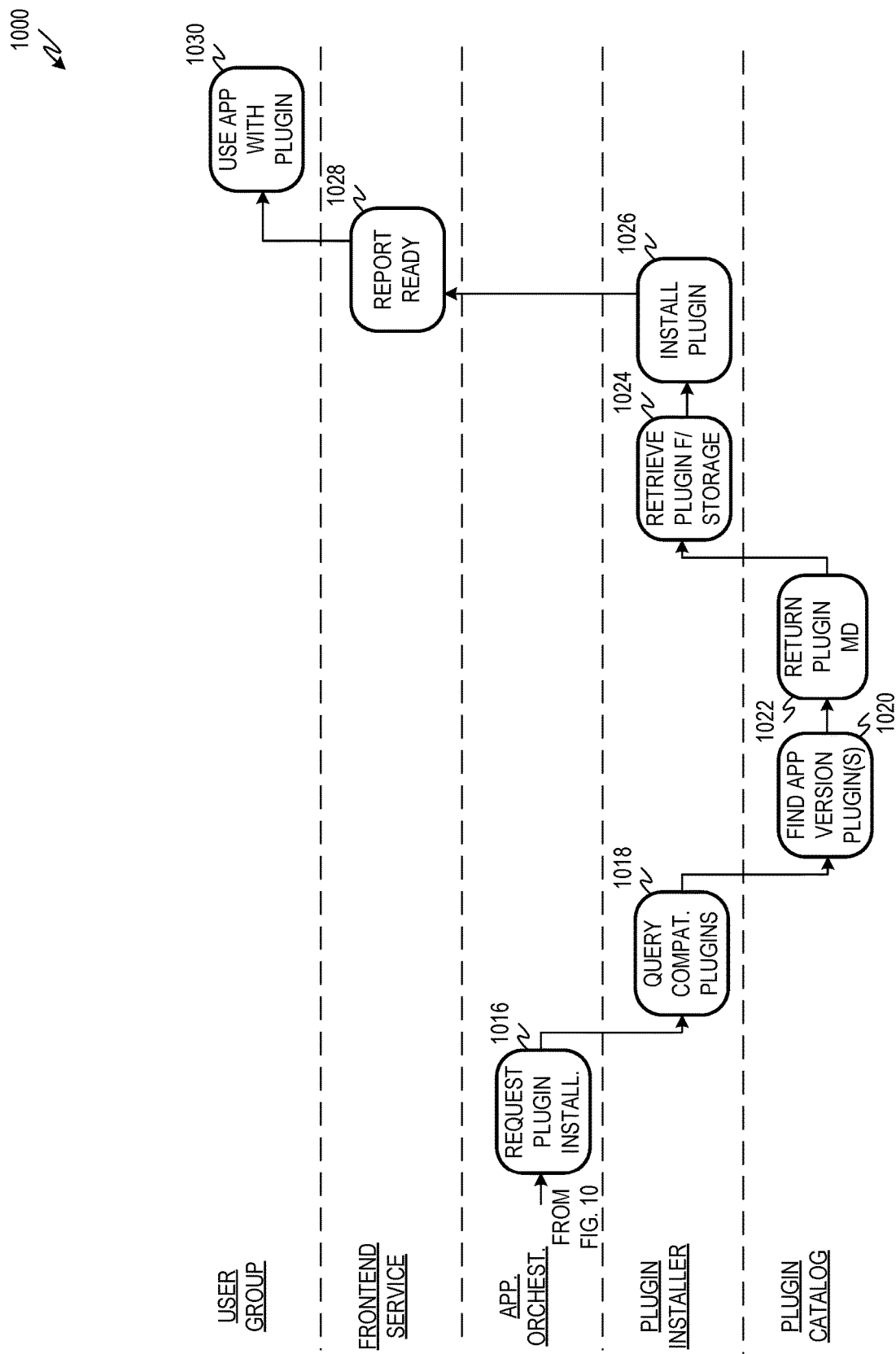

FIGS. 10 and 11 are a flowchart showing one example of a process flow 1000 for installing a plugin to an application instance considering version compatibility. The process flow 1000 is illustrated using five rows. A row labeled "User Group" includes operations that may be performed by a user group 914, 916, 918, 920 (including one or more users thereof). A user group or users may perform operations, for example, via one or more user computing devices. A row labeled "Frontend Service" includes operations that may be performed by the frontend service 912. A row labeled "App. Orchestration" includes operations that may be performed by the application orchestration service 904. A row intitled "Plugin Installer" includes operations that may be performed by the plugin installer service 931. A row entitled "Plugin Catalog" may include operations performed by the plugin catalog service 936.

At operation 1002, the user group opens an application dashboard. The application dashboard may be, for example, a component of a user interface provided by the frontend service 912. At operation 1004, the frontend service 912 queries the plugin catalog service 936 for available plugins. The plugin catalog service 936 may build a list of available plugins at operation 1006 and return the list to the frontend service 912. To determine the list of available plugins, the plugin catalog service 936 may query the plugin catalog 932 to determine plugin catalog records associated with plugins that can be installed to application instances 922, 924, 926, 928 executed for the user group. At operation 1008, the frontend service 912 may list the available plugins to the user group, e.g., via the application dashboard.

At operation 1010, the user group chooses a plugin to install. At operation 1012, the user group may select an update button or other UI element at the application dashboard to initiate installation of the selected plugin. In response, the frontend service, at operation 1014, may collect plugin parameters for the plugin to be installed. Moving to FIG. 11, at operation 1016, the application orchestration service 904 requests that the plugin installer service 931 begin installation of the plugin.

At operation 1018, the plugin installer service 931 queries the plugin catalog service 936 to provide one or more versions of the selected plugin that are compatible with the build version of the application instance. At operation 1010, the plugin catalog service 936 finds one or more versions of the selected plugin that are compatible with the build version of the application instance. For example, the plugin catalog service 936 may access the build version of the application instance. The build version can be accessed, for example, from version record metadata for the application instance and/or from the version metadata 906.

The plugin catalog service 936 uses the build version of the application instance to identify a compatible version of the plugin. For example, the plugin catalog service 936 may identify plugin catalog records indicating plugin versions that including product version selector lines indicating the build version of the application instance.

In some examples, the plugin catalog service 936 may execute the search using an equality selector and/or a match expression selector. A search using an equality selector may return the plugin catalog records of plugins having compatible build versions that exactly match the build version of the application instance. A search using a match expression selector may return the plugin catalog records of plugins having compatible build versions that match the build version of the application instance according to an indicated expression. The expressions may be based on various factors such as, for example, build versions or semantic versions. Example expressions based on build versions may return a range of plugins compatible with build versions that are greater than, greater than or equal to, less than, or less than or equal to the build version of the application instance.

Example expressions based on semantic versions may be similar, but may return a range of semantic versions of the application instance, such as whether the application instance is a major version, a minor version, a patch, etc.

Searches using match expressions and/or range or build versions may be suitable for different types of plugins. For example, some plugins are built to be compatible with a single build of the corresponding application. For example, some plugins are built against shared libraries of the application and, therefore, should have binary compatibility with shared libraries. Such a plugin may only work with a version of the application having shared libraries that maintain binary compatibility with the plugin. Accordingly, when installing such a plugin, a match expression may be used to select the version of the plugin suitable for the version of the application instance.

Consider another example type of plugin that uses a software development kit (SDK) or similar tool that serves as a layer of abstraction between the plugin and the application instance. For plugins of this type, binary compatibility between the plugin and the application instance may not be necessary. Compatibility between the plugin and a version of the application instance may be based on the use of a common SDK or application programming interface (API). Accordingly, a search for a range of semantic versions of the plugin may be suitable.

At operation 1022, the plugin catalog service 936 returns plugin metadata, such as the plugin catalog record, for one or more plugin versions compatible with the application instance to the plugin installer service 931. The plugin installer service 936 uses the returned metadata to access the referenced plugin (e.g., the plugin container image thereof) at operation 1024 and installs the plugin at operation 1026. The plugin installer service 936 may install the plugin in any suitable manner, such as those described herein. Upon completion of the installation, the frontend service 912, at operation 1028, reports to the user group that the application instance and plugin are ready for use. At operation 1030, the user group utilizes the application instance with the now-installed plugin.

Figure 12:
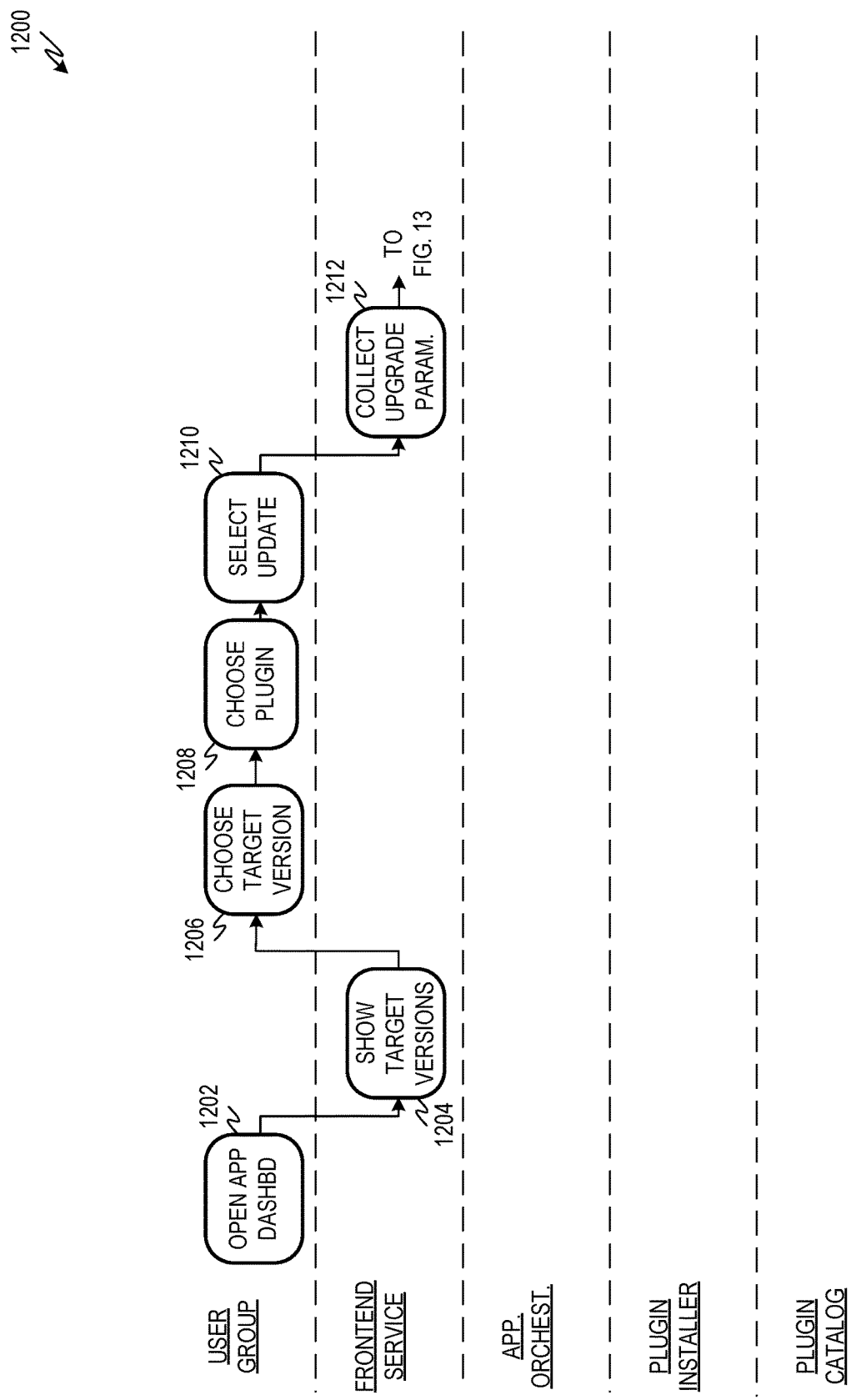
FIGS. 12 and 13 are a flowchart showing one example of a process flow for upgrading an application instance considering plugin version compatibility.
Figure 13:
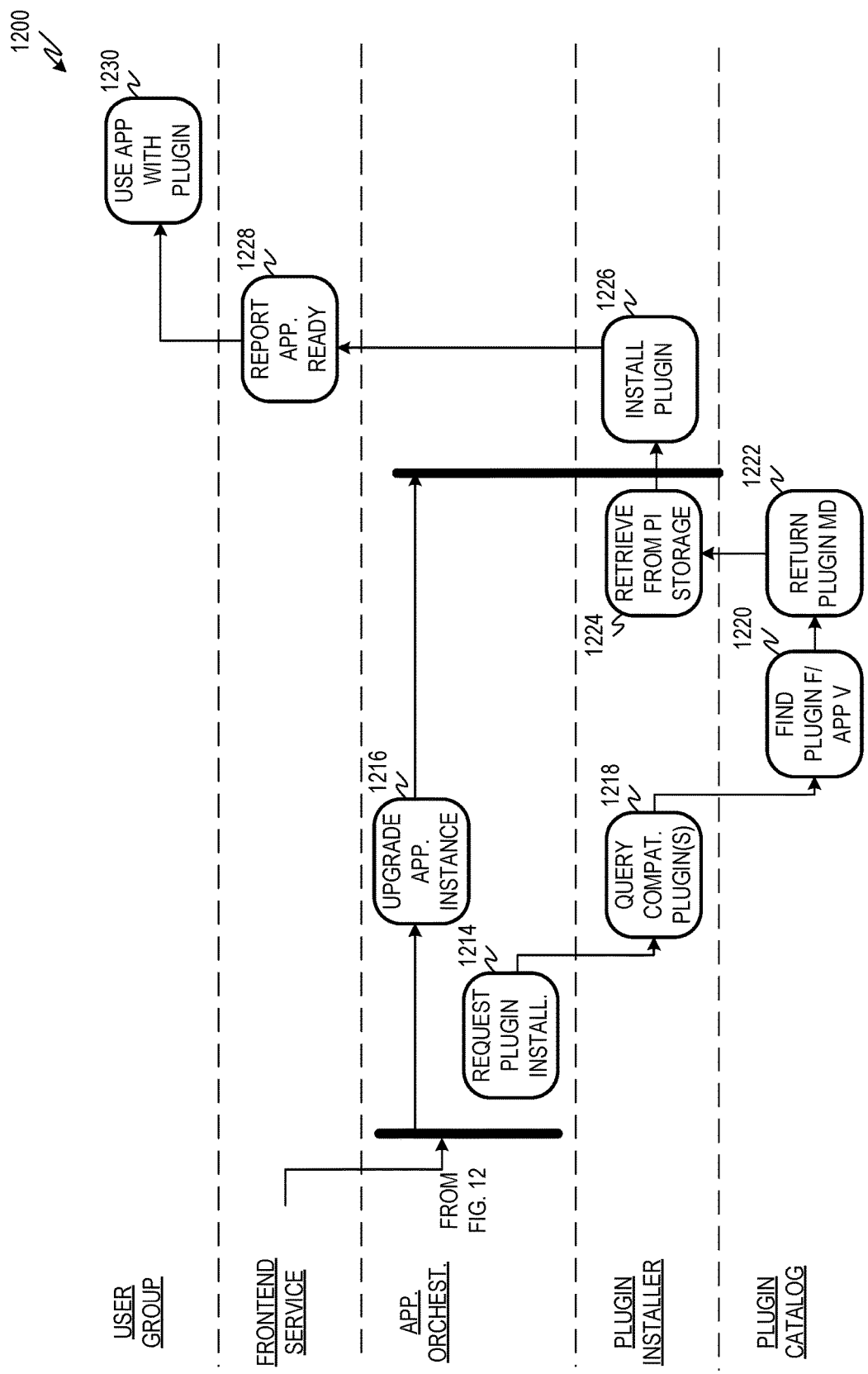

FIGS. 12 and 13 are a flowchart showing one example of a process flow 1200 for upgrading an application instance considering plugin version compatibility. The process flow 1000 is illustrated using five rows. A row labeled "User Group" includes operations that may be performed by a user group 914, 916, 918, 920 (including one or more users thereof). A user group or users may perform operations, for example, via one or more user computing devices. A row labeled "Frontend Service" includes operations that may be performed by the frontend service 912. A row labeled "App. Orchestration" includes operations that may be performed by the application orchestration service 904. A row intitled "Plugin Installer" includes operations that may be performed by the plugin installer service 931. A row entitled "Plugin Catalog" may include operations performed by the plugin catalog service 936.

At operation 1202, the user group opens an application dashboard. The application dashboard may be, for example, a component of a user interface provided by the frontend service 912. At operation 1204, the frontend service 912 displays target versions of the application available to the user group. For example, the frontend service 912 may directly or indirectly access version metadata 906 to determine target versions the available to the user group. At operation 1206, the user group selects a target version of the application. The target version may be for an upgrade to an existing application instance 922, 924, 926, 928.

At operation 1208, the user group selects one or more plugins to be included with the target version of the application. The selected plugins be based, for example, on plugins installed at the currently-executing application instance 922, 924, 926, 928 and/or selected based on plugin catalog data as described with respect to FIGS. 10 and 11. At operation 1210, the user group selects an update button or feature at the dashboard to begin the installation of the target version of the application.

At operation 1212, the frontend service 912 collects upgrade parameters for the launching of the target version of the application. Moving to FIG. 13, at operation 1216, the application orchestration service 904 may upgrade the application instance to the target version. This may involve, for example, retrieving one or more container images referenced by the version metadata 906 for the target version an launching the corresponding containers.

Before, during or after upgrading to the target application instance, the application orchestration service 904 may, at operation 1214, request that the plugin installer service 931 install the plugins indicated by the user group. The plugin installer service 931 may query the plugin catalog service at operation 1218 to provide a compatible plugin version. At operation 1220, the plugin installer service 931 may find a compatible plugin version for the target application version. This may be performed, for example, as described herein with respect to the operation 1020. At operation 1222, the plugin catalog service 936 may return metadata for the compatible plugin version to the plugin installer service 931. At operation 1224, the plugin installer service may retrieve the plugin (e.g., the plugin container image) from plugin storage 934. The plugin installer service 931 may install the plugin at operation 1226. The plugin may be installed, for example, as described herein. Upon completion of the installation, the frontend service 912, at operation 1228, reports to the user group that the target version of the application instance and plugin are ready for use. At operation 1230, the user group utilizes the application instance with the now-installed plugin.

In view of the disclosure above, various examples are set forth below. It should be noted that one or more features of an example, taken in isolation or combination, should be considered within the disclosure of this application.

EXAMPLES

Example 1 is a method for managing a cloud-implemented database management application, the method comprising: receiving, by a frontend service executing at a cloud environment, a plugin request from a first user associated with a first user group; accessing a plugin catalog, by the frontend service, to determine at least one plugin compatible with a database management application associated with the first user group and executing at the cloud environment in at least one container; providing an indication of the at least one plugin to the first user; receiving, from the first user, a selection of a first plugin from the at least one plugin; calling, by the frontend service, a plugin installer service executing at the cloud environment to install the first plugin to the database management application; and installing, by the plugin installer service, the first plugin to the database management application.

In Example 2, the subject matter of Example 1 optionally includes the installing of the first plugin to the database management application comprising installing a first plugin file to a first container of the at least one container.

In Example 3, the subject matter of Example 2 optionally includes accessing, by the plugin installer service, a plugin catalog record for the first plugin, the plugin catalog record comprising a name of the first plugin and first plugin address data indicating a location of the first plugin file at a plugin storage; and retrieving the first plugin file from the location at the plugin storage.

In Example 4, the subject matter of any one or more of Examples 1-3 optionally includes the installing of the first plugin to the database management application comprising: stopping execution of a first component of the database management application at the cloud environment in a first container of the at least one container; modifying the first component; and restarting the execution of the first component at the first container.

In Example 5, the subject matter of Example 4 optionally includes the modifying of the first component comprising modifying the first component to load a shared library upon execution.

In Example 6, the subject matter of any one or more of Examples 1-5 optionally includes the installing of the first plugin to the database management application further comprising loading to the cloud environment a library file comprising query language procedures for querying a database managed by the database management application.

In Example 7, the subject matter of any one or more of Examples 1-6 optionally includes the installing of the first plugin to the database management application further comprising beginning execution of a first plugin microservice for implementing the first plugin.

In Example 8, the subject matter of any one or more of Examples 1-7 optionally includes accessing, by the frontend service, a plugin catalog record for the first plugin, the plugin catalog record comprising a name of the first plugin and description data describing the first plugin, the providing of the indication of the at least one plugin to the first user comprising providing the description data to the first user.

In Example 9, the subject matter of any one or more of Examples 1-8 optionally includes receiving, by the frontend service and from the first user, a request to remove the first plugin; calling, by the frontend service, the plugin installer service to remove the first plugin from the database management application; and removing, by the plugin installer service, the first plugin from the database management application.

Example 10 is a system for managing a cloud-implemented database management application, the system comprising: a cloud environment comprising at least one computing device, the at least one computing device programmed to perform operations comprising: receiving, by a frontend service executing at the cloud environment, a plugin request from a first user associated with a first user group; accessing a plugin catalog, by the frontend service, to determine at least one plugin compatible with a database management application associated with the first user group and executing at the cloud environment in at least one container; providing an indication of the at least one plugin to the first user; receiving, from the first user, a selection of a first plugin from the at least one plugin; calling, by the frontend service, a plugin installer service executing at the cloud environment to install the first plugin to the database management application; and installing, by the plugin installer service, the first plugin to the database management application.

In Example 11, the subject matter of Example 10 optionally includes the installing of the first plugin to the database management application comprising installing a first plugin file to a first container of the at least one container.

In Example 12, the subject matter of Example 11 optionally includes the operations further comprising: accessing, by the plugin installer service, a plugin catalog record for the first plugin, the plugin catalog record comprising a name of the first plugin and first plugin address data indicating a location of the first plugin file at a plugin storage; and retrieving the first plugin file from the location at the plugin storage.

In Example 13, the subject matter of any one or more of Examples 10-12 optionally includes the installing of the first plugin to the database management application comprising: stopping execution of a first component of the database management application at the cloud environment in the first container; modifying the first component; and restarting the execution of the first component at the first container.

In Example 14, the subject matter of Example 13 optionally includes the modifying of the first component comprising modifying the first component to load a shared library upon execution.

In Example 15, the subject matter of any one or more of Examples 10-14 optionally includes the installing of the first plugin to the database management application further comprising loading to the cloud environment a library file comprising query language procedures for querying a database managed by the database management application.

In Example 16, the subject matter of any one or more of Examples 10-15 optionally includes the installing of the first plugin to the database management application further comprising beginning execution of a first plugin microservice for implementing the first plugin.

In Example 17, the subject matter of any one or more of Examples 10-16 optionally includes the operations further comprising accessing, by the frontend service, a plugin catalog record for the first plugin, the plugin catalog record comprising a name of the first plugin and description data describing the first plugin, the providing of the indication of the at least one plugin to the first user comprising providing the description data to the first user.

In Example 18, the subject matter of any one or more of Examples 10-17 optionally includes the operations further comprising: receiving, by the frontend service and from the first user, a request to remove the first plugin; calling, by the frontend service, the plugin installer service to remove the first plugin from the database management application; and removing, by the plugin installer service, the first plugin from the database management application.

Example 19 is a non-transitory machine-readable medium comprising instructions thereon that, when executed by at least one processor at a cloud environment, causes the at least one processor to perform operations comprising: receiving, by a frontend service executing at a cloud environment, a plugin request from a first user associated with a first user group; accessing a plugin catalog, by the frontend service, to determine at least one plugin compatible with a database management application associated with the first user group and executing at the cloud environment in at least one container; providing an indication of the at least one plugin to the first user; receiving, from the first user, a selection of a first plugin from the at least one plugin; calling, by the frontend service, a plugin installer service executing at the cloud environment to install the first plugin to the database management application; and installing, by the plugin installer service, the first plugin to the database management application.

In Example 20, the subject matter of Example 19 optionally includes the installing of the first plugin to the database management application comprising installing a first plugin file to a first container of the at least one container.

Figure 14:
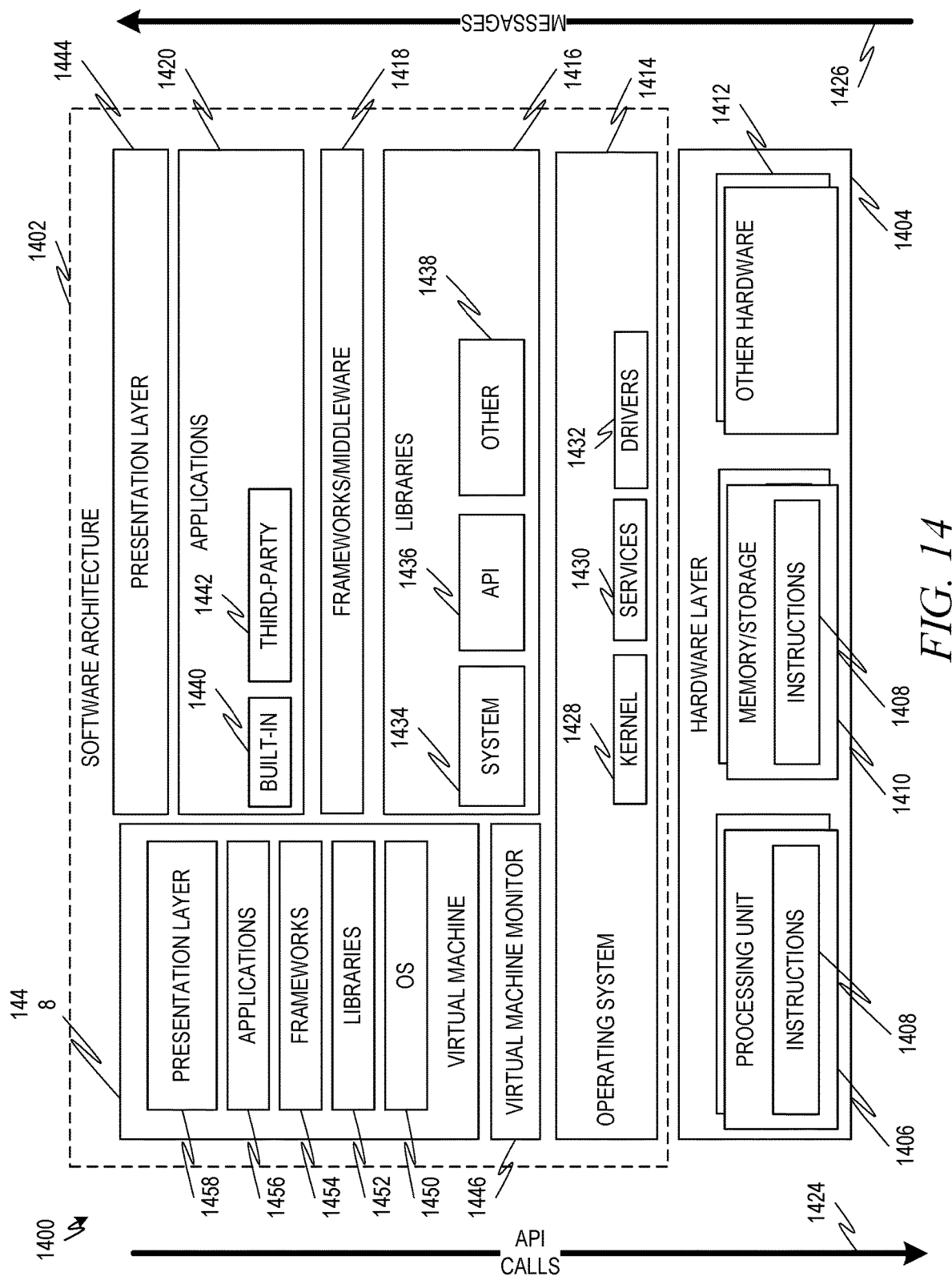
FIG. 14 is a block diagram showing one example of a software architecture for a computing device.

FIG. 14 is a block diagram 1400 showing one example of a software architecture 1402 for a computing device. The architecture 1402 may be used in conjunction with various hardware architectures, for example, as described herein. FIG. 14 is merely a non-limiting example of a software architecture and many other architectures may be implemented to facilitate the functionality described herein. A representative hardware layer 1404 is illustrated and can represent, for example, any of the above referenced computing devices. In some examples, the hardware layer 1404 may be implemented according to the architecture of the computer system of FIG. 14.

The representative hardware layer 1404 comprises one or more processing units 1406 having associated executable instructions 1408. Executable instructions 1408 represent the executable instructions of the software architecture 1402, including implementation of the methods, modules, subsystems, and components, and so forth described herein and may also include memory and/or storage modules 1410, which also have executable instructions 1408. Hardware layer 1404 may also comprise other hardware as indicated by other hardware 1412 which represents any other hardware of the hardware layer 1404, such as the other hardware illustrated as part of the architecture 1402.

In the example architecture of FIG. 14, the software architecture 1402 may be conceptualized as a stack of layers where each layer provides particular functionality. For example, the software architecture 1402 may include layers such as an operating system 1414, libraries 1416, frameworks/middleware 1418, applications 1420, and presentation layer 1444. Operationally, the applications 1420 and/or other components within the layers may invoke API calls 1424 through the software stack and access a response, returned values, and so forth illustrated as messages 1426 in response to the API calls 1424. The layers illustrated are representative in nature and not all software architectures have all layers. For example, some mobile or special purpose operating systems may not provide a frameworks/middleware layer 1418, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. In some examples, the services 1430 include an interrupt service. The interrupt service may detect the receipt of an interrupt and, in response, cause the architecture 1402 to pause its current processing and execute an interrupt service routine (ISR) when an interrupt is accessed.

The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1416 may provide a common infrastructure that may be utilized by the applications 1420 and/or other components and/or layers. The libraries 1416 typically provide functionality that allows other software modules to perform tasks in an easier fashion than to interface directly with the underlying operating system 1414 functionality (e.g., kernel 1428, services 1430 and/or drivers 1432). The libraries 1416 may include system 1434 libraries (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The frameworks 1418 (also sometimes referred to as middleware) may provide a higher-level common infrastructure that may be utilized by the applications 1420 and/or other software components/modules. For example, the frameworks 1418 may provide various graphic user interface (GUI) functions, high-level resource management, high-level location services, and so forth. The frameworks 1418 may provide a broad spectrum of other APIs that may be utilized by the applications 1420 and/or other software components/modules, some of which may be specific to a particular operating system or platform.

The applications 1420 includes built-in applications 1440 and/or third-party applications 1442. Examples of representative built-in applications 1440 may include, but are not limited to, a contacts application, a browser application, a book reader application, a location application, a media application, a messaging application, and/or a game application. Third-party applications 1442 may include any of the built-in applications 1440 as well as a broad assortment of other applications. In a specific example, the third-party application 1442 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1442 may invoke the API calls 1424 provided by the mobile operating system such as operating system 1414 to facilitate functionality described herein.

The applications 1420 may utilize built-in operating system functions (e.g., kernel 1428, services 1430 and/or drivers 1432), libraries (e.g., system 1434, APIs 1436, and other libraries 1438), and frameworks/middleware 1418 to create user interfaces to interact with users of the system. Alternatively, or additionally, in some systems interactions with a user may occur through a presentation layer, such as presentation layer 1444. In these systems, the application/module "logic" can be separated from the aspects of the application/module that interact with a user.

Some software architectures utilize virtual machines. In the example of FIG. 14, this is illustrated by virtual machine 1448. A virtual machine creates a software environment where applications/modules can execute as if they were executing on a hardware computing device. A virtual machine is hosted by a host operating system (operating system 1414) and typically, although not always, has a virtual machine monitor 1446, which manages the operation of the virtual machine as well as the interface with the host operating system (i.e., operating system 1414). A software architecture executes within the virtual machine such as an operating system 1450, libraries 1452, frameworks/middleware 1454, applications 1456 and/or presentation layer 1458. These layers of software architecture executing within the virtual machine 1448 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 15:
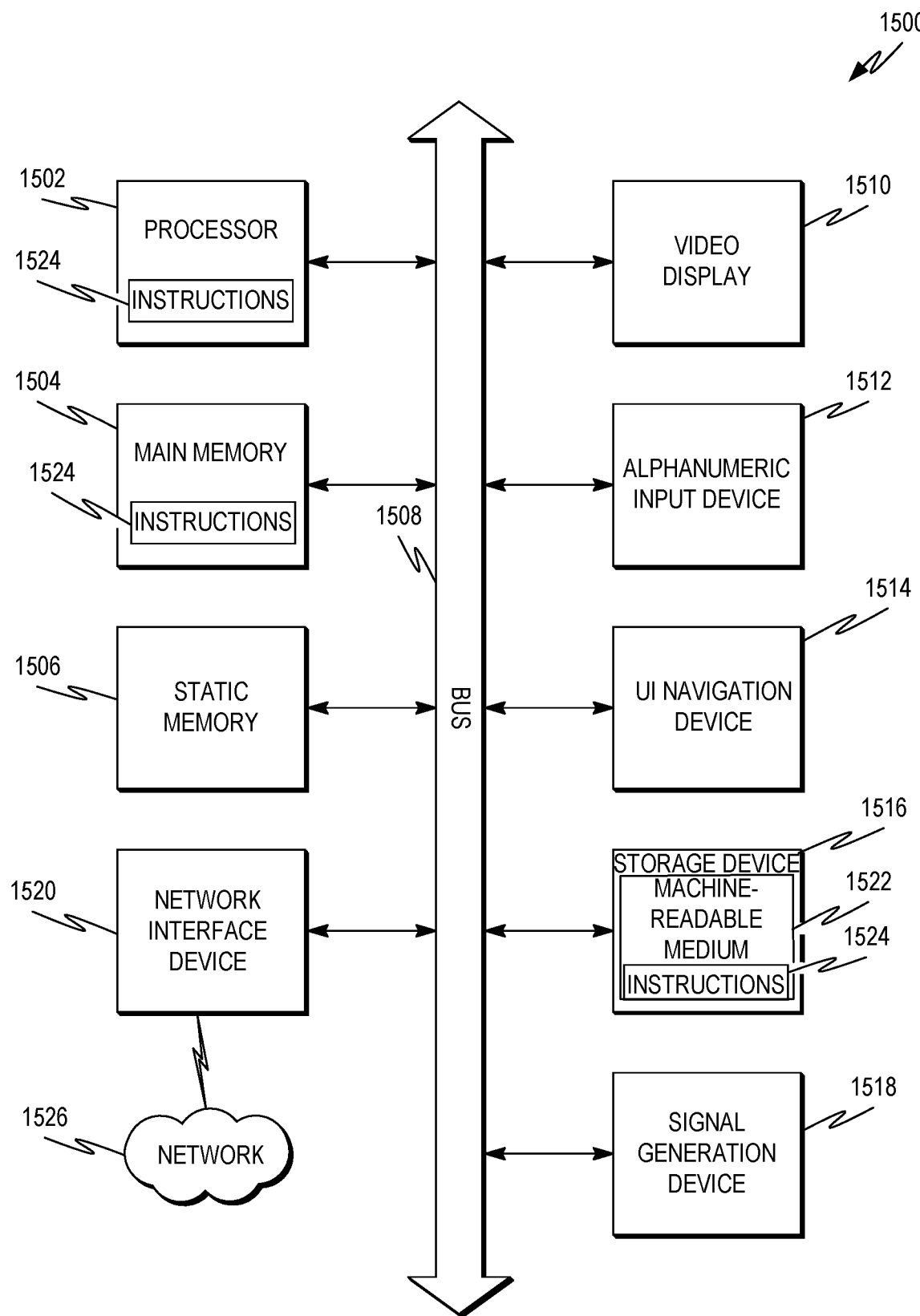
FIG. 15 is a block diagram of a machine in the example form of a computer system within which instructions may be executed for causing the machine to perform any one or more of the methodologies discussed herein.

FIG. 15 is a block diagram of a machine in the example form of a computer system 1500 within which instructions 1524 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU), or both), a main memory 1504, and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard or a touch-sensitive display screen), a user interface (UI) navigation (or cursor control) device 1514 (e.g., a mouse), a disk drive unit 1516, a signal generation device 1518 (e.g., a speaker), and a network interface device 1520.

Machine-Readable Medium

The disk drive unit 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the computer system 1500, with the main memory 1504 and the processor 1502 also constituting machine-readable media 1522.

While the machine-readable medium 1522 is shown in an example embodiment to be a single medium, the term "machine-readable medium" may include a single medium or multiple media (e.g., a centralized or distributed database, and/or associated caches and servers) that store the one or more instructions 1524 or data structures. The term "machine-readable medium" shall also be taken to include any tangible medium that is capable of storing, encoding, or carrying instructions 1524 for execution by the machine and that cause the machine to perform any one or more of the methodologies of the present disclosure, or that is capable of storing, encoding, or carrying data structures utilized by or associated with such instructions 1524. The term "machine-readable medium" shall accordingly be taken to include, but not be limited to, solid-state memories, and optical and magnetic media. Specific examples of machine-readable media 1522 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1524 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for managing a cloud-implemented database management application, the method comprising:

receiving, by a frontend service executing at a cloud environment, a plugin request from a first user associated with a first user group of a plurality of user groups, the plugin request being received via a user computing device remote from the cloud environment;

accessing a plugin catalog, by the frontend service, to determine at least one plugin compatible with a database management application instance associated with the first user group and executing at the cloud environment in at least one container;

providing an indication of the at least one plugin to the first user via the user computing device;

receiving, from the first user and via the user computing device, a selection of a first plugin from the at least one plugin;

calling, by the frontend service, a plugin installer service executing at the cloud environment to install the first plugin to the database management application instance; and installing, by the plugin installer service, the first plugin to the database management application instance.

2. The method of claim 1, the installing of the first plugin to the database management application instance comprising installing a first plugin file to a first container of the at least one container.

3. The method of claim 2, further comprising:

accessing, by the plugin installer service, a plugin catalog record for the first plugin, the plugin catalog record comprising a name of the first plugin and first plugin address data indicating a location of the first plugin file at a plugin storage; and retrieving the first plugin file from the location at the plugin storage.

4. The method of claim 1, the installing of the first plugin to the database management application comprising:

stopping execution of a first component of the database management application instance at the cloud environment in a first container of the at least one container;

modifying the first component; and restarting the execution of the first component at the first container.

5. The method of claim 4, the modifying of the first component comprising modifying the first component to load a shared library upon execution.

6. The method of claim 1, the installing of the first plugin to the database management application instance further comprising loading to the cloud environment a library file comprising query language procedures for querying a database managed by the database management application instance.

7. The method of claim 1, the installing of the first plugin to the database management application instance further comprising beginning execution of a first plugin microservice for implementing the first plugin.

8. The method of claim 1, further comprising accessing, by the frontend service, a plugin catalog record for the first plugin, the plugin catalog record comprising a name of the first plugin and description data describing the first plugin, the providing of the indication of the at least one plugin to the first user comprising providing the description data to the first user.

9. The method of claim 1, further comprising:
receiving, by the frontend service and from the first user, a request to remove the first plugin;
calling, by the frontend service, the plugin installer service to remove the first plugin from the database management application instance; and
removing, by the plugin installer service, the first plugin from the database management application instance.

10. A system for managing a cloud-implemented database management application, the system comprising:
a cloud environment comprising at least one computing device, the at least one computing device programmed to perform operations comprising:
receiving, by a frontend service executing at the cloud environment, a plugin request from a first user associated with a first user group of a plurality of user groups, the plugin request being received via a user computing device remote from the cloud environment;
accessing a plugin catalog, by the frontend service, to determine at least one plugin compatible with a database management application instance associated with the first user group and executing at the cloud environment in at least one container;
providing an indication of the at least one plugin to the first user via the user computing device;
receiving, from the first user and via the user computing device, a selection of a first plugin from the at least one plugin;
calling, by the frontend service, a plugin installer service executing at the cloud environment to install the first plugin to the database management application instance; and
installing, by the plugin installer service, the first plugin to the database management application instance.

11. The system of claim 10, the installing of the first plugin to the database management application instance comprising installing a first plugin file to a first container of the at least one container.

12. The system of claim 11, the operations further comprising:
accessing, by the plugin installer service, a plugin catalog record for the first plugin, the plugin catalog record comprising a name of the first plugin and first plugin address data indicating a location of the first plugin file at a plugin storage; and
retrieving the first plugin file from the location at the plugin storage.

13. The system of claim 10, the installing of the first plugin to the database management application instance comprising:
stopping execution of a first component of the database management application instance at the cloud environment in the first container;
modifying the first component; and
restarting the execution of the first component at the first container.

14. The system of claim 13, the modifying of the first component comprising modifying the first component to load a shared library upon execution.

15. The system of claim 10, the installing of the first plugin to the database management application instance further comprising loading to the cloud environment a library file comprising query language procedures for querying a database managed by the database management application instance.

16. The system of claim 10, the installing of the first plugin to the database management application instance further comprising beginning execution of a first plugin microservice for implementing the first plugin.

17. The system of claim 10, the operations further comprising accessing, by the frontend service, a plugin catalog record for the first plugin, the plugin catalog record comprising a name of the first plugin and description data describing the first plugin, the providing of the indication of the at least one plugin to the first user comprising providing the description data to the first user.

18. The system of claim 10, the operations further comprising:
receiving, by the frontend service and from the first user, a request to remove the first plugin;
calling, by the frontend service, the plugin installer service to remove the first plugin from the database management application instance; and
removing, by the plugin installer service, the first plugin from the database management application instance.

19. A non-transitory machine-readable medium comprising instructions thereon that, when executed by at least one processor at a cloud environment, causes the at least one processor to perform operations comprising:
receiving, by a frontend service executing at a cloud environment, a plugin request from a first user associated with a first user group of a plurality of user groups, the plugin request being received via a user computing device remote from the cloud environment;
accessing a plugin catalog, by the frontend service, to determine at least one plugin compatible with a database management application instance associated with the first user group and executing at the cloud environment in at least one container;
providing an indication of the at least one plugin to the first user via the user computing device;
receiving, from the first user and via the user computing device, a selection of a first plugin from the at least one plugin;
calling, by the frontend service, a plugin installer service executing at the cloud environment to install the first plugin to the database management application instance; and
installing, by the plugin installer service, the first plugin to the database management application instance.

20. The non-transitory machine-readable medium of claim 19, the installing of the first plugin to the database management application instance comprising installing a first plugin file to a first container of the at least one container.

\* \* \* \* \*